United States Patent
Sen et al.

(10) Patent No.: US 10,551,901 B2
(45) Date of Patent: Feb. 4, 2020

(54) CORE FREQUENCY MANAGEMENT USING EFFECTIVE UTILIZATION FOR POWER-EFFICIENT PERFORMANCE

(71) Applicant: Microsoft Technology Licensing, LLC, Redmond, WA (US)

(72) Inventors: Rathijit Sen, Madison, WI (US); Alan Dale Halverson, Verona, WI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 15/640,537

(22) Filed: Jul. 1, 2017

(65) Prior Publication Data
US 2019/0004585 A1 Jan. 3, 2019

(51) Int. Cl.
*G06F 1/324* (2019.01)
*G06F 1/3206* (2019.01)
*G06F 1/08* (2006.01)
*G06F 9/50* (2006.01)

(52) U.S. Cl.
CPC ............ *G06F 1/324* (2013.01); *G06F 1/3206* (2013.01); *G06F 1/08* (2013.01); *G06F 9/505* (2013.01)

(58) Field of Classification Search
CPC . G06F 1/324; G06F 1/08; G06F 9/505; G06F 1/3206
USPC ......................................... 713/300, 320, 322
See application file for complete search history.

(56) References Cited

U.S. PATENT DOCUMENTS

| | | | |
|---|---|---|---|
| 6,829,713 B2 | 12/2004 | Cooper et al. | |
| 8,327,126 B2 | 12/2012 | Bell, Jr. et al. | |
| 8,589,707 B2 | 11/2013 | Subramanian et al. | |
| 8,924,756 B2 | 12/2014 | Kaburlasos et al. | |
| 9,354,943 B2 | 5/2016 | Bose et al. | |
| 9,495,001 B2 | 11/2016 | Varma et al. | |

(Continued)

OTHER PUBLICATIONS

Brandewie, et al., "Extract from linux/drivers/cpufreq/intel_pstate. c", Retrieved from: https://github.com/torvalds/linux/blob/fab24dcc395637557a7988a867e7b3a5823917a9/drivers/cpufreq/intel_pstate.c, Jun. 30, 2017, 37 Pages.

(Continued)

*Primary Examiner* — Ji H Bae
(74) *Attorney, Agent, or Firm* — Alleman Hall Creasman & Tuttle LLP

(57) ABSTRACT

A frequency governing method for a processor includes reading power management information from the processor. The processor operates in an active state or one of multiple power saving states. The power management information includes first information indicating occupancy of a first core of the processor in the active state and second information indicating occupancy of the first core in a first power saving state. The method includes generating an effective utilization based on the first information and the second information. The method includes setting a target frequency by performing a selected action of a first action including increasing the target frequency and a second action including decreasing the target frequency with respect to a current frequency of the processor based on the effective utilization. The selected action is selected according to the effective utilization. The method includes instructing the processor to operate the first core at the target frequency.

19 Claims, 15 Drawing Sheets

(56) References Cited

U.S. PATENT DOCUMENTS

| | | | |
|---|---|---|---|
| 9,575,537 | B2 | 2/2017 | Ignowski et al. |
| 2008/0148027 | A1 | 6/2008 | Fenger et al. |
| 2009/0271646 | A1 | 10/2009 | Talwar et al. |
| 2010/0162023 | A1* | 6/2010 | Rotem .................. G06F 1/3203 713/340 |
| 2010/0332856 | A1 | 12/2010 | Song |
| 2011/0145624 | A1* | 6/2011 | Rychlik ................ G06F 1/3203 713/600 |
| 2011/0283286 | A1 | 11/2011 | Wu et al. |
| 2013/0151879 | A1* | 6/2013 | Thomson ................ G06F 1/329 713/322 |
| 2016/0378168 | A1 | 12/2016 | Branover et al. |
| 2018/0081382 | A1* | 3/2018 | Tsao ........................ G05F 1/565 |

OTHER PUBLICATIONS

"International Search Report and Written Opinion Issued in PCT Application No. PCT/US18/035251", dated Sep. 27, 2018, 12 Pages.
Meisner, et al., Power management of online data-intensive services; Jun. 4, 2011; In Proceedings of the 38th annual international symposium on Computer architecture; 12 pages.
Weiser, et al., Scheduling for reduced CPU energy; Nov. 14, 1994; In Proceedings of the 1st USENIX conference on Operating Systems Design and Implementation; 11 pages.
Lang, et al.; Towards eco-friendly database management systems; Jan. 4, 2009; In Proceedings of Fourth Biennial Conference on Innovative Data Systems Research; 8 pages.
Vega, et al.; Crank it up or dial it down: Coordinated multiprocessor frequency and folding control; Dec. 7, 2013; In Proceedings of the 46th Annual IEEE/ACM International Symposium on Microarchitecture; 12 pages.
Kanev, et al.; Tradeoffs between power management and tail latency in warehouse-scale applications; Oct. 26, 2014; In Proceedings of IEEE International Symposium on Workload Characterization; 10 pages.
Prekas, et al.; Energy proportionality and workload consolidation for latency-critical applications; Aug. 27, 2015; In Proceedings of the Sixth ACM Symposium on Cloud Computing; 14 pages.
Hsu, et al.; Adrenaline: Pinpointing and reining in tail queries with quick voltage boosting; Feb. 7, 2015; In Proceedings of IEEE 21st International Symposium on High Performance Computer Architecture; 12 pages.
Kasture, et al.; Rubik: Fast analytical power management for latency-critical systems; Dec. 5, 2015; In Proceedings of the 48th International Symposium on Microarchitecture; 13 pages.
Wong, et al.; Peak efficiency aware scheduling for highly energy proportional servers; Jun. 18, 2016; In Proceedings of the 43rd International Symposium on Computer Architecture; 12 pages.
Sen, et al.; Pareto governors for energy-optimal computing; Mar. 2017; In Journal of ACM Transactions on Architecture and Code Optimization, vol. 14, Issue 1; 25 pages.
Advanced configuration and power interface specification; Unified EFI, Inc.; Jan. 2016; 1082 pages.

Intel® Xeon® processor E5-1600/E5-2600/E5-4600 product families datasheet; May 2012; 258 pages.
Dean, et al.; The Tail Scale; Feb. 2013; Communications of the ACM, vol. 56, Issue 2; 7 pages.
SQL Server on Linux Documentation; Linux; 2017; 286 pages.
Brodowski, et al.; Linux CPUFreq—CPUFreq Governors; Apr. 24, 2017; 5 pages.
Intel P-State driver; Apr. 24, 2017; 4 pages.
Rabeler, et al.; Azure SQL database benchmark overview; Jun. 21, 2016; 6 pages.
SLA for SQL Database; May 2016; 4 pages.
Barroso, et al.; The Case for Energy-Proportional Computing; Dec. 2007; In Journal of Computer, vol. 40, Issue 12; 5 pages.
Azure SQL Database DTU Calculator; Apr. 24, 2017; 2 pages.
Rabeler, et al.; SQL database options and performance: Understand what's available in each service tier; Apr. 24, 2017; 9 pages.
Rountree, et al.; Beyond DVFS: A First Look at Performance under a Hardware-Enforced Power Bound; May 21, 2012; In Proceedings of IEEE 26th International Parallel and Distributed Processing Symposium Workshops & PhD Forum; 7 pages.
Lo, et al.; Towards Energy Proportionality for Large-Scale Latency-Critical Workloads; Jun. 14, 2014; In Proceeding of 41st Annual International Symposium on Computer Architecture; 12 pages.
Liu, et al.; SleepScale: Runtime Joint Speed Scaling and Sleep States Management for Power Efficient Data Centers; Jun. 14, 2014; In Proceeding of 41st Annual International Symposium on Computer Architecture; 12 pages.
Chou, et al.; DynSleep: Fine-grained Power Management for a Latency-Critical Data Center Application; Aug. 8, 2016; In Proceedings of International Symposium on Low Power Electronics and Design; 6 pages.
Chen, Shimin; Power Management Features in Intel Processors; Intel Labs Pittsburgh; Feb. 24, 2010; 43 pages.
Sen et al.; Node-level Coordinated Power-Performance Management; 2016; 12 pages.
Zhao et al.; Fine-Grained Per-Core Frequency Scheduling for Power Efficient Multicore Execution; IEEE; 2011; 8 pages.
Zhan et al.; CARB: A C-State Power Management Arbiter for Latency-Critical Workloads; IEE Computer Architecture Letter; 2015; 4 pages.
Intel and Core i7 (Nehalem) Dynamic Power Management; 2009; 11 pages.
Torres, Gabriel; Everything you need to know about the CPU C-States Power Saving Modes; Hardware Secrets; Sep. 5, 2008; 2 pages.
Power Management States: P-States, C-States, and Packages C-States; Intel; 2014; 22 pages.
Levinthal, David; Performance Analysis Guide for Intel® Core™ i7 Processor and Intel® Xeon™ 5500 Processors; Version 1.0; 2008-2009; 72 pages.
DB-Engines Ranking; https://db-engines.com/en/ranking; Jul. 2017; 11 pages.
DB-Engines Ranking—Trend Popularity; https://db-engines.com/en/ranking_trend; Jul. 2017; 1 page.

* cited by examiner

CORE FREQUENCY MANAGEMENT USING EFFECTIVE UTILIZATION FOR POWER-EFFICIENT PERFORMANCE

FIELD

The present disclosure relates to processor frequency control, and more particularly to frequency control of processors having multiple power saving states.

BACKGROUND

Modern processors may be able to operate in different power saving states. In some implementations, these power saving states are defined by an Advanced Configuration and Power Interface (ACPI) specification, such as Section 8 of the ACPI specification version 6.1, the entire disclosure of which is incorporated by reference. Taking a simplistic example of a one core processor, the processor may execute instructions while in an active state, which may be labeled C0.

If the processor is waiting on another system component, which will be generally slower than the processor (for example, main memory or secondary storage), the processor may enter a power saving state. For example, when a halt instruction, rather than a substantive instruction, is being executed by the processor, the processor may enter a first power saving state, labeled C1. The clock of the execution unit may be gated so that in the power saving state, the clock is not passed through to the execution units and the execution units are no longer consuming power. The processor can resume operation by re-allowing the clock to be passed through.

If the processor will be idle for a longer period of time, the processor may enter another, deeper power saving state. For example, this power saving state may be labeled C3. In this second power saving state, the level 1 cache, and in some instances, the level 2 cache, of the processor is flushed so that power to the caches can be removed. The level 1 and 2 caches are generally volatile, meaning that removing power will cause the contents to be erased. To refill the cache takes more time, so the processor requires additional time to return to the active state from the second power saving state. However, when the processor will be idle for a longer period of time, such as when requesting data from main memory, entering the second power saving state may be worthwhile.

Still further power saving states are available in various processor architectures. For example, a third power saving state may save off state data from the processor's volatile storage and then remove power to most of the functional units of the processor. For example, caches, pipeline registers, architectural registers, clock distribution circuitry, branch predictors, arithmetic units, etc. may be powered down. The clock generation circuitry may remain powered to avoid the additional latency of generation of the clock resuming and stabilizing. In order to resume execution, the saved state is reloaded into the processor.

The third power saving state may be worthwhile when the processor is waiting for a much higher-latency task, such as a disk access or when the processor is idle/inactive such as while waiting for the next transaction to arrive. The tradeoffs between the latency and power savings of power saving states may be determined by the designers of the processors and may be systematized in a power management unit of the processor.

In the active state (C0), there may be multiple performance levels. For example, a highest performance state (labeled P0) may be the highest frequency at which the processor can operate. If the processor is lightly loaded, the processor may operate at a lower performance state, such as a state labeled P1. Different processor architectures, and even different processor models sharing an architecture, may have different sets of performance states. For example, defined performance states from P0 to Pn, where n is an integer greater than one, may be defined by the processor. In some processors, a range of frequencies are available and may not necessarily map to specific P numbers. Instead, the frequency of the processor may be adjustable anywhere within the range subject to a set increment, or granularity. For example, the frequency of the processor may be adjusted in increments of 100 MHz.

In more modern processors, the processor includes more than one core. Further, each core may, depending on the processor model, be able to execute multiple threads. Except in the very rare instances in which all of the threads executing across all the cores of the processor consistently present a uniform load, certain cores of the processor may be more lightly loaded at certain times than others. Therefore, the processor power management may adjust the power saving state of each core separately.

Further, some recent processors allow the performance state of the processor to be adjusted per core. In other words, in addition to being able to enter individual cores into separate power saving states, the frequency of each core may be adjusted independently in the active state. In other implementations, groups of cores may be controlled together. For example, in an eight-core processor, each pair of cores may be set to a frequency that is independent of the other pairs of cores.

Simply as a graphical illustration and not representative of any specific processor, FIG. 1 depicts a processor with four power states: three power saving states and an active (C0) power state 10. The C0 power state includes five performance states: performance state 0 (20-0), performance state 1 (20-1), performance state 2 (20-2), and performance state 3 (20-3). Simply for illustration, the performance states 20-0, 20-1, 20-2, and 20-3 correspond to frequencies of 2.3 GHz, 2.1 GHz, 1.8 GHz, and 1.2 GHz, respectively.

Further, in some multi-core processors, when fewer than all cores are in the C0 state 10, one or more higher performance states (sometimes referred to as turbo states) are available. The ability to run a subset of cores at a higher frequency is generally due to thermal management. The processor and any associated heat sink may only be able to dissipate the heat generated from a subset of cores operating at a higher frequency. In FIG. 1, performance state 24 may allow a single core to operate at 3.0 GHz when the other cores are in a power saving state.

In FIG. 1, inactive power saving states include an idle state 32-1 (C1, also called a first power saving state), a second power saving state 32-2 (C3), and a third power saving state 32-3 (C6). Although performance cannot be negative, the depth of the graphical bars for the power saving states are a graphical reminder of the latency involved in returning from a power saving state.

In other words, the amount of time required to return to the active state 10 from the first power saving state 32-1 is much less than the latency to return from the second power saving state 32-2, which, in turn, is less than the time required to resume execution from the inactive state 32-3. For example only, the second power saving state 32-2 may involve flushing the L1 and L2 caches, while the power saving state 32-3 may include saving the state of the core and removing power from most functional units. To be clear, the latency depicted for the power saving states 32 is a different, not comparable, scale to the frequency depicted for the performance states 20.

The labels C1, C3, and C6 were shown in FIG. 1 simply to illustrate the fact that certain processors implement power saving states that are a subset of the power saving states defined by the manufacturer or by the ACPI specification. In addition, a processor manufacturer may define additional power saving states that are not industry standard (though they may be defined by the processor manufacturer according to the format of the ACPI specification).

In FIG. 2, a more granular array 40 of performance states may be available. For example, the frequency of the processor may be adjusted arbitrarily by predefined increments. In some implementations, higher performance states 44 of the array 40 require that at least some of the cores be in one of the power saving states 32.

Operating systems include frequency governors designed with various tradeoffs between power and performance. These frequency governors may instruct the processor at which frequency to operate each processor core. For example, Linux distribution Ubuntu, from Canonical Ltd., includes several frequency governors grouped into two classes. See the following table:

| CLASS | GOVERNOR | TYPE | SHORT DESCRIPTION |
|---|---|---|---|
| Cpufreq | Performance | static | All cores at maximum (turbo) frequency. |
| | Powersave | static | All cores at minimum frequency. |
| | Ondemand | dynamic | Governor changes core frequencies depending on core utilization. |
| | Conservative | dynamic | Similar to Ondemand governor, but changes frequencies more gradually. |
| | Userspace | — | Frequencies can be reconfigured by the administrator. |
| Intel P-State | Performance | static | Similar to Cpufreq Performance governor. |
| | Powersave | dynamic | Similar in strategy to Cpufreq Ondemand governor, but with a different implementation. |

An operating system user with root privileges may be able to switch governors within a class while the operating system is running. However, changing the class may require modifying a kernel perimeter and rebooting the system. These prior art frequency governors often fail to save power at high loads or suffer significant performance loss. Failing to save power increases the energy footprint of the device, the negative effects of which are magnified at cloud scale. On the other hand, failing to maximize performance may require additional systems or more stringent hardware specifications in order to handle a given load. For a fixed hardware environment, failing to maximize performance may lead to worse application-level performance for customers, such as slower response times or lower transaction throughput.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A frequency governing method for a processor includes reading power management information from the processor. The processor is configured to selectively operate in a plurality of power saving states. The power management information includes (i) first information indicating occupancy of a first core of the processor in an active state and (ii) second information indicating occupancy of the first core of the processor in a first power saving state of the plurality of power saving states. The method includes generating an effective utilization based on the first information and the second information. The method includes setting a target frequency by performing a selected action of a first action including increasing the target frequency and a second action including decreasing the target frequency with respect to a current frequency of the processor based on the effective utilization. The selected action is selected according to the effective utilization. The method includes instructing the processor to operate the first core at the target frequency.

In other features, the first action is selected if the effective utilization is greater than a threshold, and the second action is selected if the effective utilization is less than the threshold. In other features, decreasing the target frequency includes setting the target frequency to a product of the effective utilization and the current frequency of the processor.

In other features, the effective utilization is generated based on a first number and a second number. The first number is based on the first information. The second number is based on the second information. The first number indicates a fraction of time the first core occupied the active state since a prior analysis. The second number indicates a fraction of time the first core occupied a subset of the plurality of power saving states since the prior analysis. The subset of the plurality of power saving states is a proper subset and includes at least the first power saving state. In other features, the effective utilization is generated based on a division of the first number by a sum of the first number and the second number.

In other features, the processor includes multiple cores including the first core. The method includes instructing the processor to operate all of the multiple cores at the target frequency. The method includes one of (i) determining an individual effective utilization for each core of the multiple cores and averaging the individual effective utilizations to generate the effective utilization and (ii) averaging the first information across the multiple cores, averaging the second information across the multiple cores, and generating the effective utilization based on the averaged first information and the averaged second information.

In other features, the processor includes multiple cores including the first core. The method includes performing the reading, the generating, the setting, and the instructing separately for each core of the multiple cores. In other features, from among the plurality of power saving states, a latency of the first core to return to the active state is greatest for the first power saving state.

A frequency governor system for a processor having a first core includes a power state data collection subsystem configured to read power management information from the processor. The processor is configured to selectively operate in a plurality of power saving states. The power management information includes (i) first information indicating occupancy of the first core of the processor in an active state and (ii) second information indicating occupancy of the first core of the processor in a first power saving state of the plurality of power saving states. The system includes a utilization analyzer configured to generate an effective utilization based on the first information and the second information. The system includes a frequency control circuit configured to set a target frequency by performing a selected action of a first action including increasing the target frequency and a second action including decreasing the target frequency with respect to a current frequency of the processor based on the effective utilization. The selected action is selected according to the effective utilization. The frequency control circuit is configured to instruct the processor to operate the first core at the target frequency.

In other features, the frequency control circuit is configured to select the first action if the effective utilization is greater than a threshold and select the second action if the effective utilization is less than the threshold. In other features, the frequency control circuit is configured to decrease the target frequency by setting the target frequency to a product of the effective utilization and the current frequency of the processor.

In other features, the utilization analyzer is configured to generate the effective utilization based on a first number and a second number. The first number is based on the first information. The second number is based on the second information. The first number indicates a fraction of time the first core occupied the active state since a prior analysis by the utilization analyzer. The second number indicates a fraction of time the first core occupied a subset of the plurality of power saving states since the prior analysis. The subset of the plurality of power saving states is a proper subset and includes at least the first power saving state. In other features, the utilization analyzer is configured to generate the effective utilization based on a division of the first number by a sum of the first number and the second number.

In other features, the processor includes multiple cores including the first core. The frequency control circuit is configured to instruct the processor to operate all of the multiple cores at the target frequency. The utilization analyzer is configured to generate the effective utilization by one of (i) determining an individual effective utilization for each core of the multiple cores and averaging the individual effective utilizations to generate the effective utilization and (ii) averaging the first information across the multiple cores, averaging the second information across the multiple cores, and generating the effective utilization based on the averaged first information and the averaged second information.

A frequency governor system for a processor having a first core includes power state data collection means for reading power management information from the processor. The processor is configured to selectively operate in a plurality of power saving states. The power management information includes (i) first information indicating occupancy of the first core of the processor in an active state and (ii) second information indicating occupancy of the first core of the processor in a first power saving state of the plurality of power saving states. The system includes utilization analysis means for generating an effective utilization based on the first information and the second information. The system includes frequency control means for setting a target frequency by performing a selected action of a first action including increasing the target frequency and a second action including decreasing the target frequency with respect to a current frequency of the processor based on the effective utilization. The selected action is selected according to the effective utilization. The frequency control means instructs the processor to operate the first core at the target frequency.

In other features, the frequency control means selects the first action if the effective utilization is greater than a threshold and selects the second action if the effective utilization is less than the threshold. In other features, the frequency control means decreases the target frequency by setting the target frequency to a product of the effective utilization and the current frequency of the processor.

In other features, the utilization analysis means generates the effective utilization based on a first number and a second number. The first number is based on the first information. The second number is based on the second information. The first number indicates a fraction of time the first core occupied the active state since a prior analysis by the utilization analysis means. The second number indicates a fraction of time the first core occupied a subset of the plurality of power saving states since the prior analysis. The subset of the plurality of power saving states is a proper subset and includes at least the first power saving state. In other features, the utilization analysis means generates the effective utilization based on a division of the first number by a sum of the first number and the second number.

In other features, the processor includes multiple cores including the first core. The frequency control means instructs the processor to operate all of the multiple cores at the target frequency. The utilization analysis means generates the effective utilization by one of (i) determining an individual effective utilization for each core of the multiple cores and averaging the individual effective utilizations to generate the effective utilization and (ii) averaging the first information across the multiple cores, averaging the second information across the multiple cores, and generating the effective utilization based on the averaged first information and the averaged second information.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
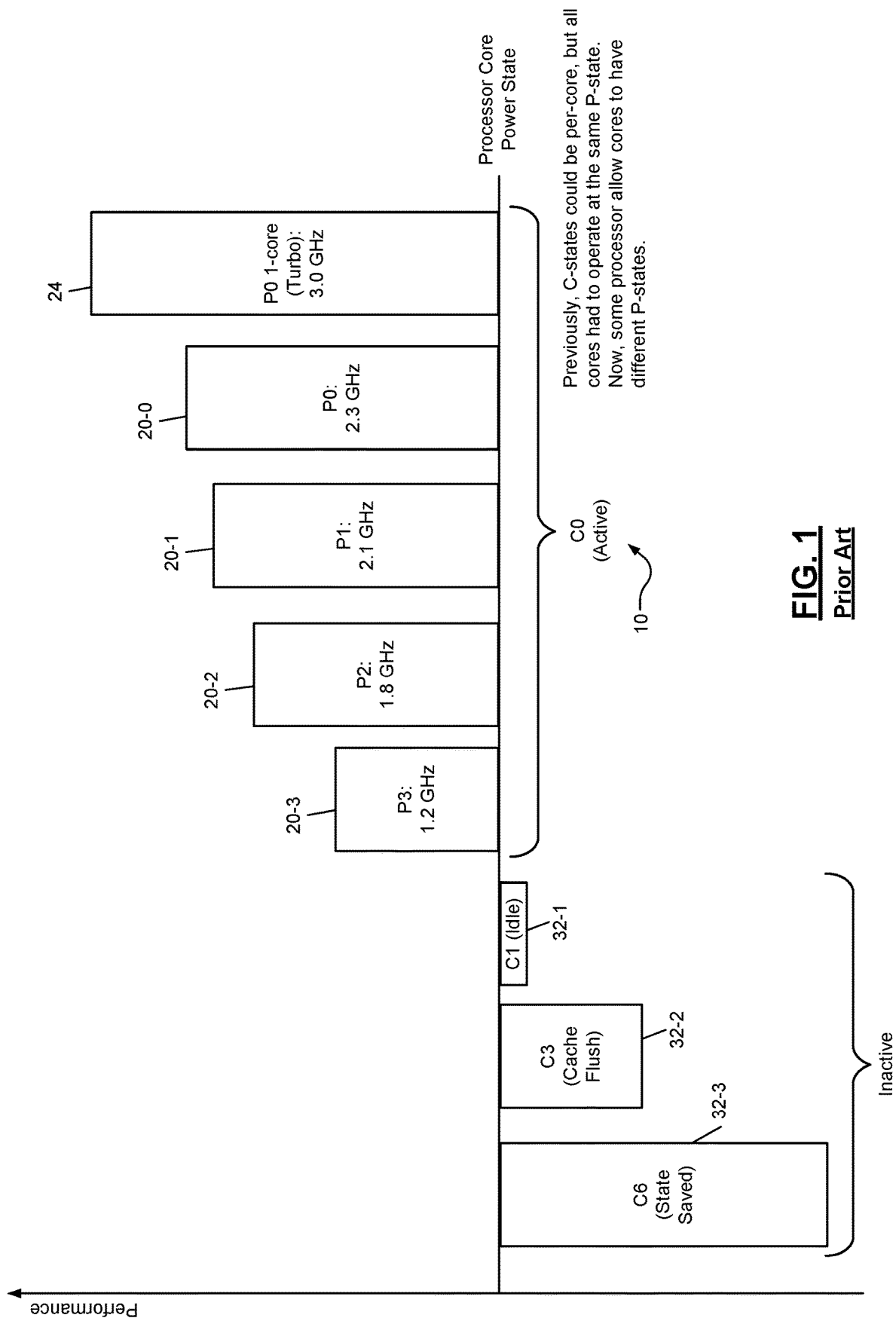
FIG. 1 is a graphical illustration of processor performance in various power states.
Figure 2:
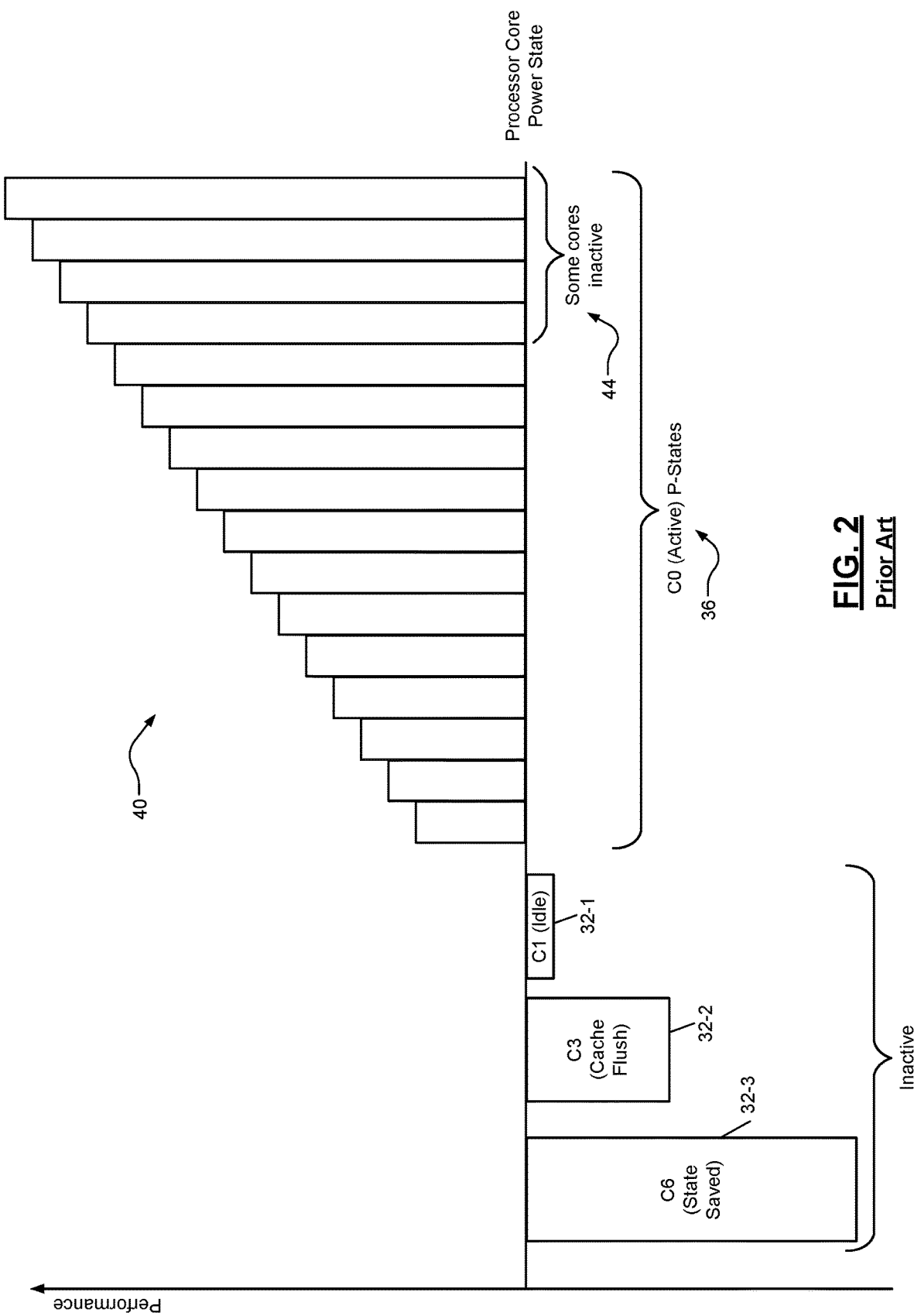
FIG. 2 is a graphical representation of processor performance in various power states for processor models having finer granularity of frequency control.

Frequency governors attempt to minimize power consumption while still handling the load presented to the processor. Some frequency governors attempt to analyze load by looking at application layer metrics, such as query response time or transactions per second. However, these metrics may not be fully correlated with the activity level of the processor at any given point in time. Further, in environments where virtual machines or containers are being hosted by the operating system, the operating system and the underlying hardware may not have visibility into these application layer metrics (see FIG. 6).

One performance-aware power saving technique that does not rely on application layer metrics is to set processor frequencies so that each core is fully utilized. However, identifying full utilization is difficult. If the active (C0) state is used as the only measurement of active time, a frequency governor may underestimate the load. This is because the processor may transition out of the C0 state into a power saving state (such as the C1 inactive state) due to delays in other systems, not inactivity.

For example, the C1 state may be entered due to slower storage or network delays or other scheduling delays. It may also be caused by C-state demotion, where a deeper sleep state is not entered because it is speculated that wakeup may happen shortly. If power saving state transitions are performed quickly enough, and/or if main memory latency is slow enough relative to the processor clock, fetching data from main memory may even cause a transition to C1.

The time that the processor spends in the inactive state is not necessarily reflective of a decreased load; instead, a lower percentage of time being spent in the C0 state may be an indication that the processor is waiting on other subsystems, such as I/O (input/output). In other words, observing that the C0 state is occupied only 82% of the time may not necessarily mean that the frequency should be decreased so that the percentage of C0 time approaches 100%. By considering only C0 occupancy, an aggressive power saving governor may lose half of the possible throughput by erroneously assuming that lower C0 occupancy means lower load.

The present disclosure describes that certain power saving states (such as C1 and C3) are indicative of delays imposed on the processor, while other inactive states (such as C6) represent actual underutilization of the processor. Therefore, instead of controlling to maximize C0 occupancy, a frequency governor may instead control to minimize the occupancy in the power saving states that indicate underutilization. In other words, for systems where state C6 is assessed to indicate underutilization, the frequency of a core may be decreased to drive the percentage of time spent in state C6 close to 0%. Alternatively, this can be phrased as decreasing the frequency to drive the percentage of time spent in other states (C0, C1 and C3) close to 100%.

The present disclosure describes a frequency governor that, in certain operating regimes, decreases the amount of power used compared to traditional frequency governors and, in other operating regimes, increases performance with respect to other frequency governors. This new frequency governor improves on governors that only consider core utilization (the percentage of time spent in the C0 state). Such governors either do not aggressively save power at high loads or suffer large throughput losses if C1 or C3 states are significantly occupied by the processor cores.

Example Implementation

In the following, the notation fCn denotes the fraction of time (expressed as a real number between 0 and 1) spent in power state Cn, where n is an integer. In some implementations, n can be any string, which may include an integer or a combination of integer and letter (such as "1e").

The fraction of time that a core is active, fC0, scales inversely with the core's frequency. This scaling is generally not linear because some contributors to execution time, such as memory hierarchy stall times, are not affected by core frequency. The value fC6 may indicate underutilization because power state C6 is only entered when the processor expects to be idle for a long period of time. Decreasing fC6 by decreasing processor frequency increases fC0. The sum of fCn for n between 1 and 5, inclusive, may be generally unaffected by core frequency. This is because these states are generally caused directly or indirectly by I/O (including storage and networking) or other scheduling events whose latency does not directly depend on processor core frequency.

With $C_{freq}$ denoting the current frequency for a core, the governor selects a target frequency, $T_{freq}$, such that:

$$\left(\frac{C_{freq}}{T_{freq}}\right) \times fC0 + \sum_{n=1}^{5} fCn \leq 1$$

Recognizing that the sum of fCn for all n is equal to 1, the sum of fCn for n from 1 to 5 can be rewritten as 1 minus the sum of fCn for n outside of the range 1-5. In the current example, states C0 and C6 are the only power saving states outside of the range 1-5. The above equation can therefore be rewritten as follows:

$$\left(\frac{C_{freq}}{T_{freq}}\right) \times fC0 + (1 - fC0 - fC6) \leq 1$$

Solving for $T_{freq}$ in this inequality leads to:

$$T_{freq} \geq \left(\frac{fC0}{fC0 + fC6}\right) \times C_{freq}$$

The ratio of fC0 to the sum of fC0 and fC6 is referred to as the effective utilization, $\rho_{\mathit{eff}}$. Mathematically, $\rho_{\mathit{eff}}$ must be less than or equal to 1 and if the target frequency is based on multiplying the current frequency by a number less than or equal to 1, this inequality indicates only how to lower operating frequency.

To correct for overutilization, the frequency governor increases $T_{\mathit{freq}}$ when $\rho_{\mathit{eff}}$ exceeds a threshold. For example, the governor may increase $T_{\mathit{freq}}$ by a predetermined increment whenever $\rho_{\mathit{eff}}$ exceeds 0.99. The predetermined increment may vary based on the current frequency of the processor core. For example, below a threshold (such as 2 GHz), a 100 MHz increment may be used, while above that threshold, a 10 MHz increment may be used. The smaller value of the frequency increment in the higher frequencies is motivated by the expensive power consumption of higher frequencies. For example, the threshold may correspond to the area of turbo operation (that is, frequencies at which not all processor cores can operate simultaneously). Instead of two increments, an expression may be used that decreases the increment as the current frequency increases. The expression may include a floor specifying the smallest increment as well as a ceiling specifying the largest increment.

These particular parameter choices may slightly favor power savings over performance losses, and therefore, particular implementations may adjust these values based on the priorities of the system design. The frequency governor may schedule an iteration of $T_{\mathit{freq}}$ calculation after every 10 milliseconds. However, with processing time and scheduling delays, the frequency governor may be invoked fewer than the expected 100 times a second (1 s/10 milliseconds). For example, the governor may actually be invoked approximately 70 times per second.

Figure 8:
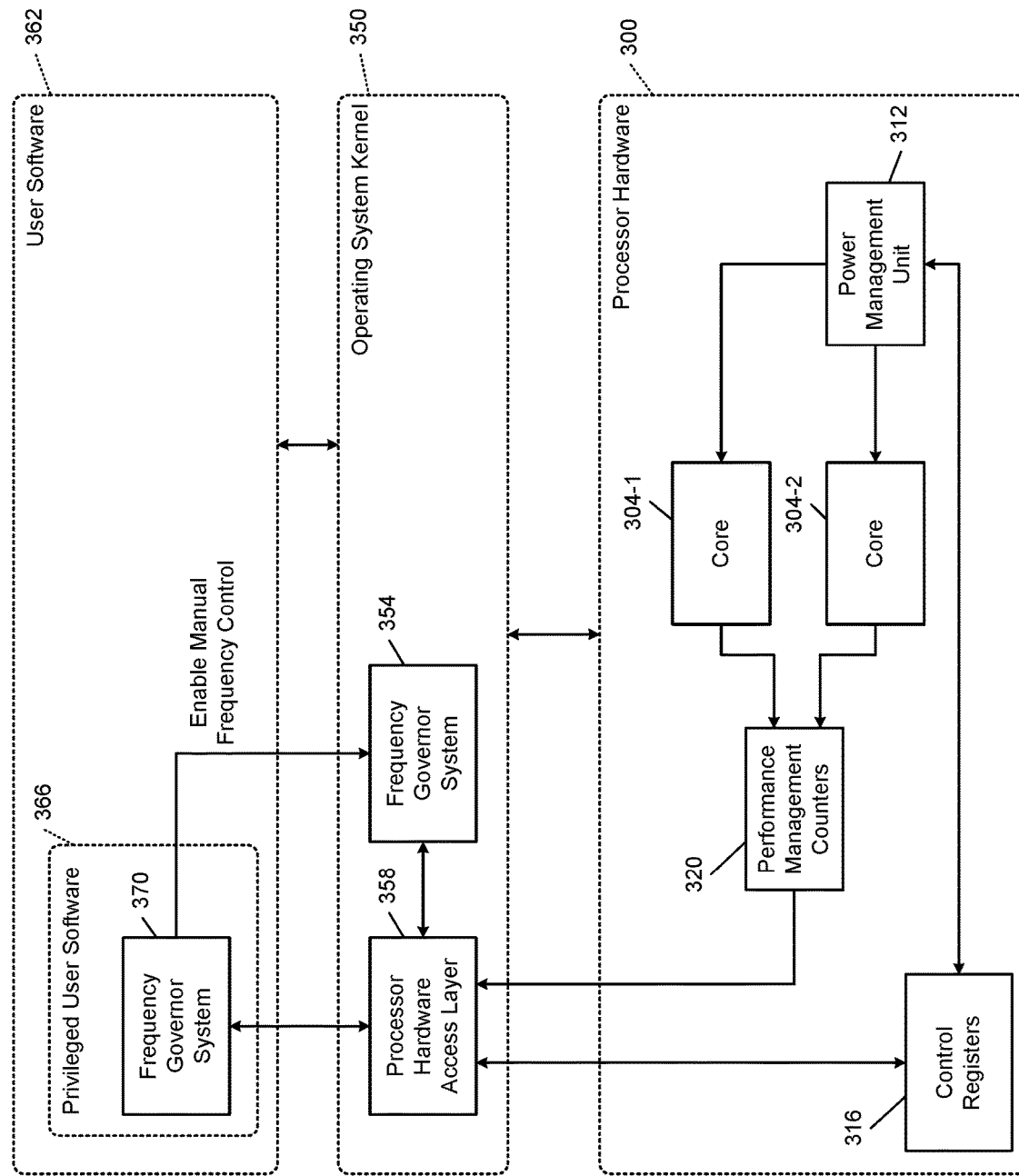
FIG. 8 is a functional block diagram depicting user software control of processor power management.
Figure 9:
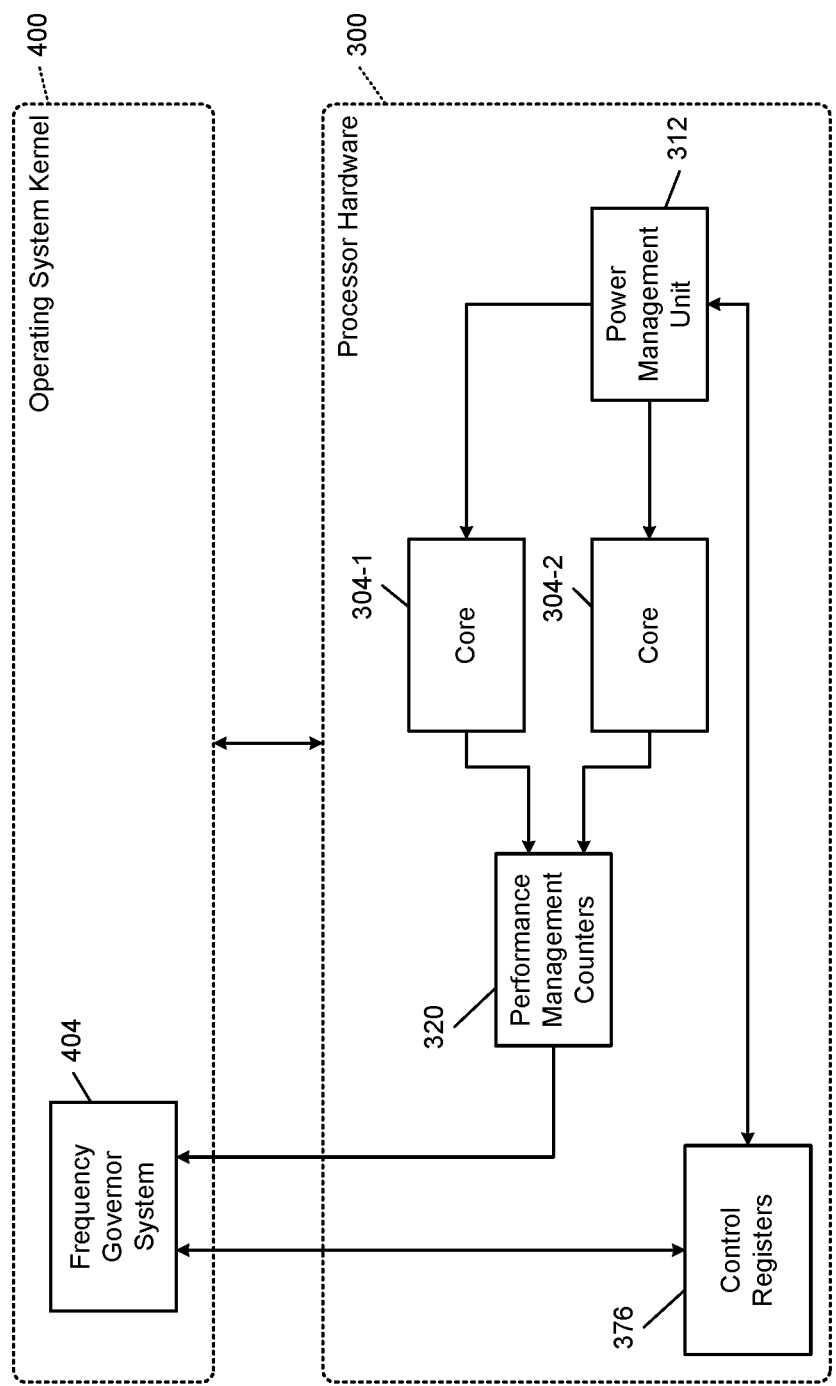
FIG. 9 is a functional block diagram of operating system control of processor power management.
Figure 10:
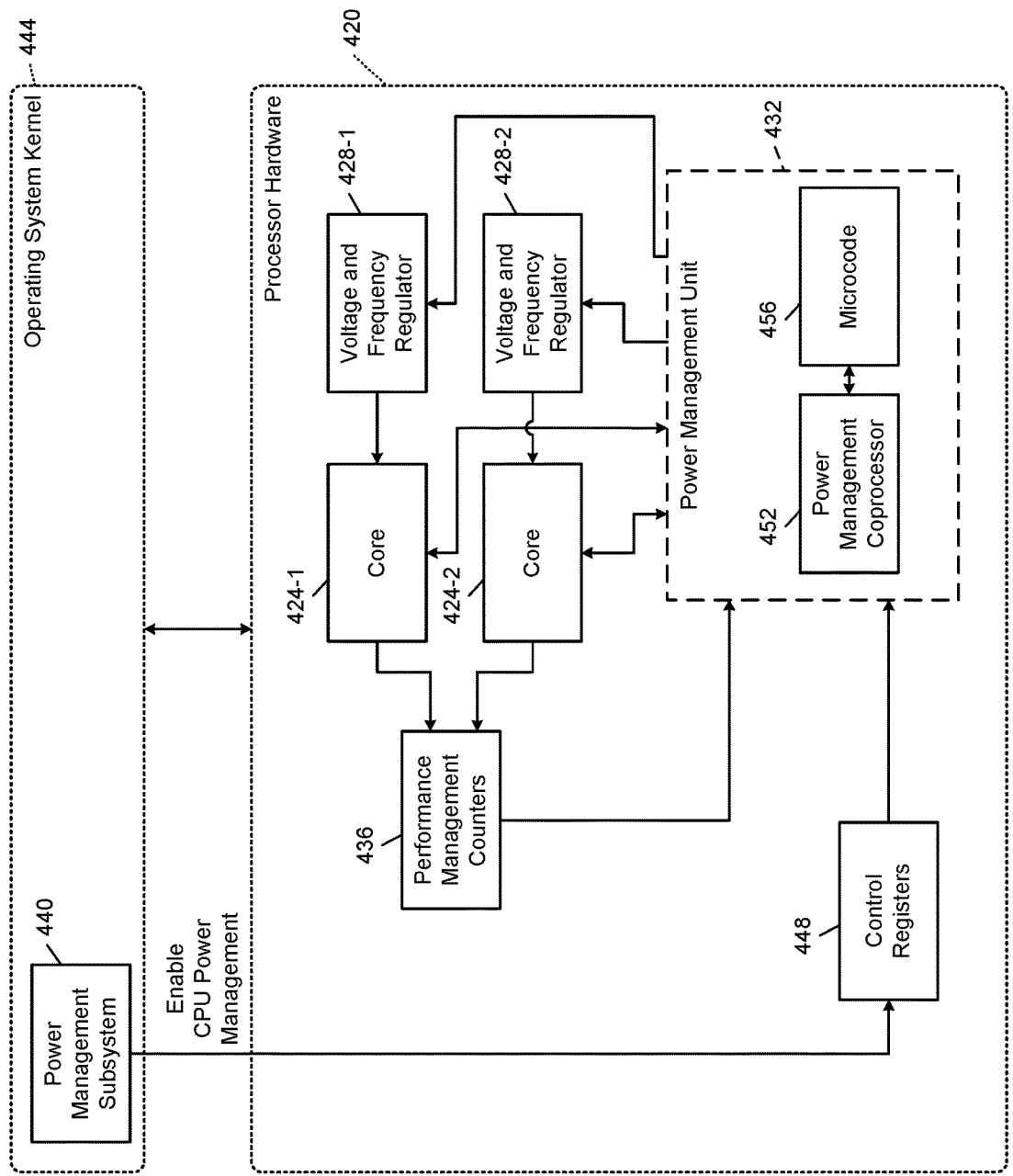
FIG. 10 is a functional block diagram of an example implementation of processor hardware incorporating frequency control of the present disclosure.

The frequency governor may be implemented in user software (as shown in FIG. 8), as part of the operating system (FIG. 9) either in the kernel or a driver, as part of the BIOS (basic input/output system), or by the processor itself (FIG. 10). The effective utilization based on the power states may be measured per core and the frequency controlled per core for processors that allow different frequencies for different cores. In processors or systems where frequencies of multiple cores are controlled together, the effective utilization may be averaged across the cores. For example, the effective utilization may be calculated for a single core, for a subset of cores of one processor, for all of the cores of one processor, or for cores of multiple processors in a system.

Figure 4:
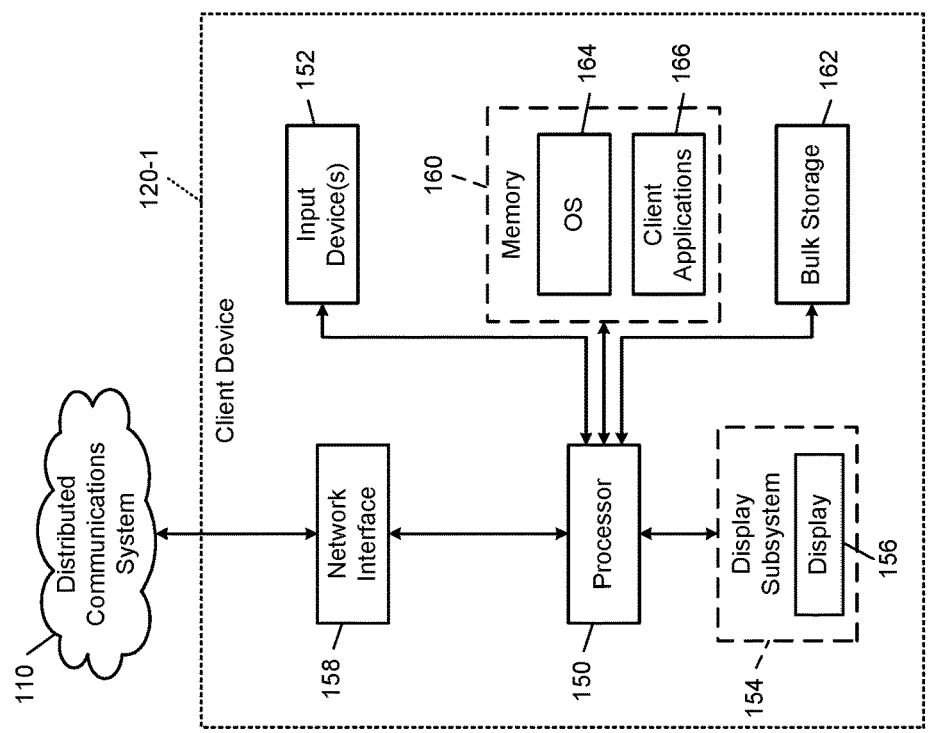
FIG. 4 is a functional block diagram of an example client device that may implement the frequency control of the present disclosure.
Figure 5:
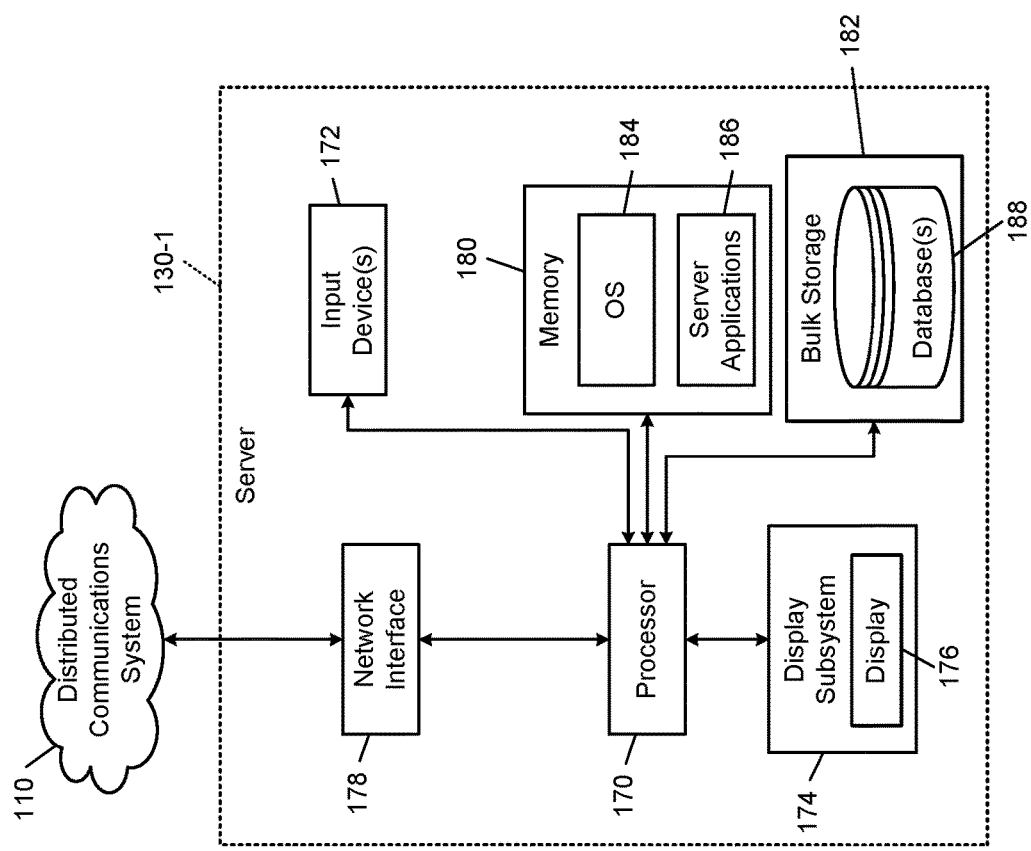
FIG. 5 is a functional block diagram of an example server implementing frequency control according to the present disclosure.

The frequency governor of the present disclosure may be implemented in servers (such as is shown in FIG. 5) whether those servers are standalone or in a distributed computing or cloud environment. The frequency governor may also be used in client devices (see FIG. 4), such as desktop and portable computers. Further, personal devices, such as smartphones and wearable devices, may implement the frequency governor of the present disclosure. For cloud systems, the decrease in power may save on energy costs and greenhouse gas emissions as well as operating costs for a data center. For portable devices, the frequency governor may extend battery life.

Experiment

To test the frequency governor on a server task, an online transaction processing (OLTP) workload was used for testing purposes. In one test, a ThinkStation P710 desktop computer from Lenovo Group Ltd. includes dual-socket Xeon Broadwell processors (E5-2620 v4) from Intel Corp. These processors have a total of 32 logical cores with simultaneous multi-threading (also known as hyper-threading) enabled. Further, the computer includes 64 GB of double data rate (DDR4) memory, two 512 GB solid state disks (SSDs) configured as a single logical volume and two 1 TB magnetic disks.

A database server, such as SQL server from Microsoft Corp., is configured on a distribution of Linux such as Ubuntu 16.04.1 LTS from Canonical Ltd. The database server is configured to store data and logs on the logical volume formed by the SSDs. These processors support dynamic voltage and frequency scaling in which core frequency scaling is accompanied by a change in voltage, which results in a cubic or nearly cubic change in dynamic power or at least a linear change in static power.

These processors support per-core frequency control, which may be actuated by writing frequency values to model specific registers (MSRs). The maximum frequency when all cores are active is 2.3 GHz. The entire power used by the system can be measured by a power meter placed in line with the mains AC power supply.

The test workload includes a database schema of six tables and a mix of nine types of transactions that involve reads, inserts, updates, and deletes of records. The transactions are initiated by many connection threads running on a separate client networked with the test machine. A "pacing delay" is defined as the average time in seconds between completion of one transaction and the start of the next transaction for each thread. The pacing delay can be varied over time to observe the response of the frequency governor to a change in load. Specifically, in this test the time between the completion of one transaction and the start of the next transaction for a thread is an exponentially-distributed random variable with a mean set to the pacing delay and a maximum capped to 10 times the pacing delay.

Figure 15A:
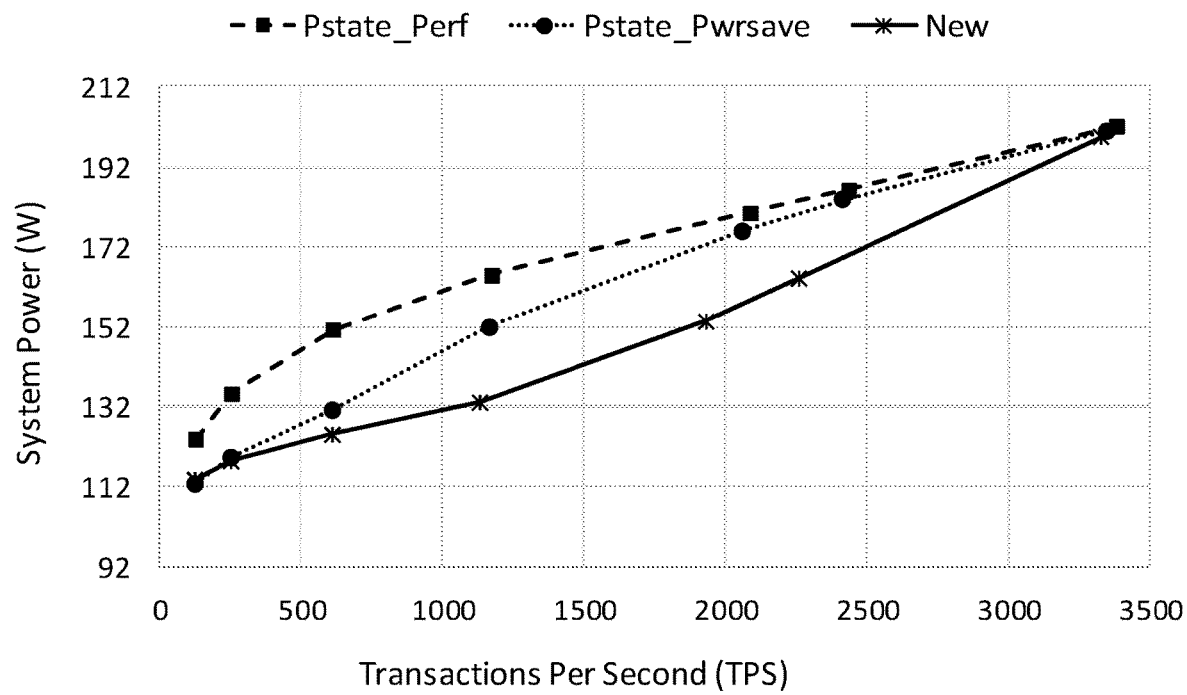
FIG. 15A is plot of system power versus load for three different frequency governing systems.
Figure 15B:
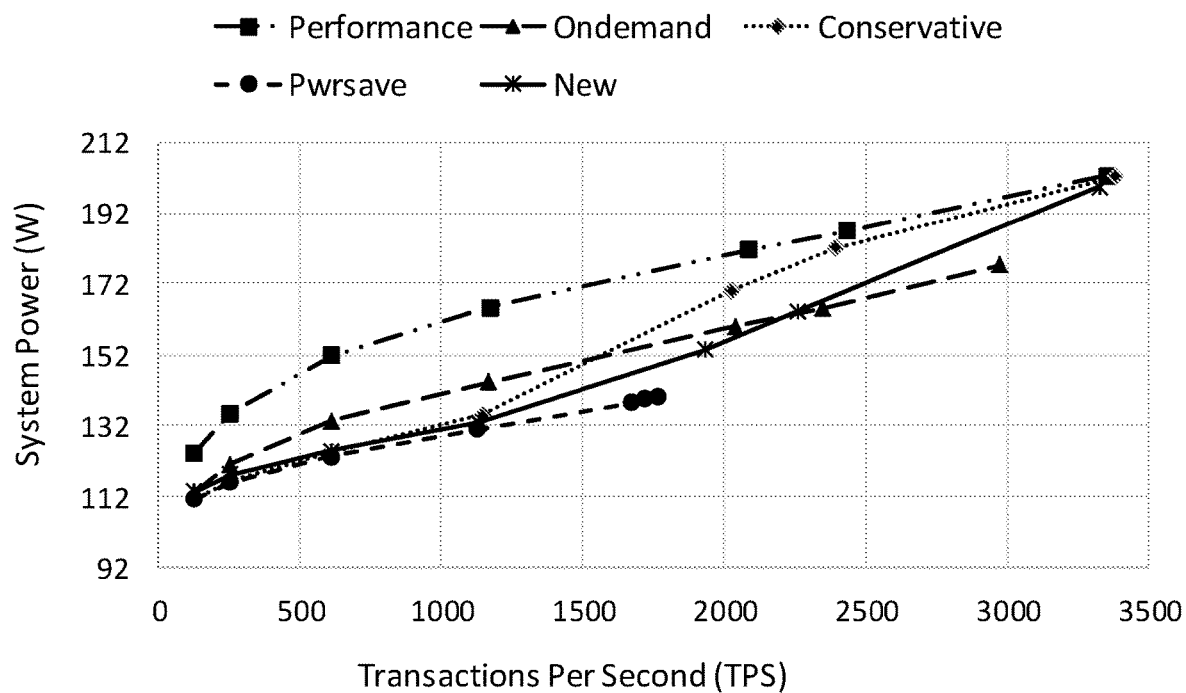
FIG. 15B is a plot of system power versus load for five frequency governing systems.

In the plots of FIGS. 15A and 15B, the pacing delay is decreased from 1 through 0.5, 0.2, 0.1, 0.05, 0.04, all the way through 0 (in which there is no delay between one transaction completing and the request for the next to begin). For each value of pacing delay, the benchmark is run for 15 minutes of steady state following a startup period, such as two minutes. Because the way in which database workloads interact with the hardware may evolve over time, the database was restored to a known state before each frequency governor was tested.

Observations include that fC6 decreases as load increases due to decreasing opportunity for cores to reside in the deep sleep state. fC0 (active state) increases with load but only reaches approximately 82% at full load, with nearly all of the remainder of time being spent in C1. For a fixed load, fC6 increases and fC0 decreases as core frequency goes up since the core finishes processing work faster.

FIGS. 15A and 15B compare the frequency governor of the present disclosure (labeled as "New") compared to existing frequency governors. The load, expressed as transactions per second (TPS), is increased by decreasing the pacing delay. In FIG. 15A, the new frequency governor is compared to the P-state Performance and P-state Powersave frequency governors. In FIG. 15B, the new frequency governor is compared to the Cpufreq Performance, Powersave, On-demand, and Conservative frequency governors. Transactions per second and power consumed both increase with load (decreasing values of pacing delay).

Generally, a resource governor should scale power with load served as well as aim to select power-performance Pareto-optimal configurations. In other words, the frequency governor should be configured to consume the least amount of power for the loads served. Compared to the P-state Performance and Cpufreq Performance governors, the Cpufreq Powersave governor saves the most power (approximately 34 watts at D=0.1), but can serve only low to intermediate loads. The Cpufreq on-demand governor saves less power but can serve a wider range of loads. However, it significantly loses throughput compared to the Cpufreq performance governor at the full D=0 load.

The remaining governors are able to achieve the full throughput, though their power efficiency varies greatly over the range of loads. As seen, the new frequency governor consumes no more power, and in some cases, consumes much less power, at each level of load compared to the other frequency governors that can serve the full range of loads. The new frequency governor can be adjusted to achieve different tradeoffs between performance and power. For example, by increasing the frequency increment for lower frequencies, the throughput of the new frequency governor can be increased at the expense of slightly higher power consumption.

Device Implementations

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 3:
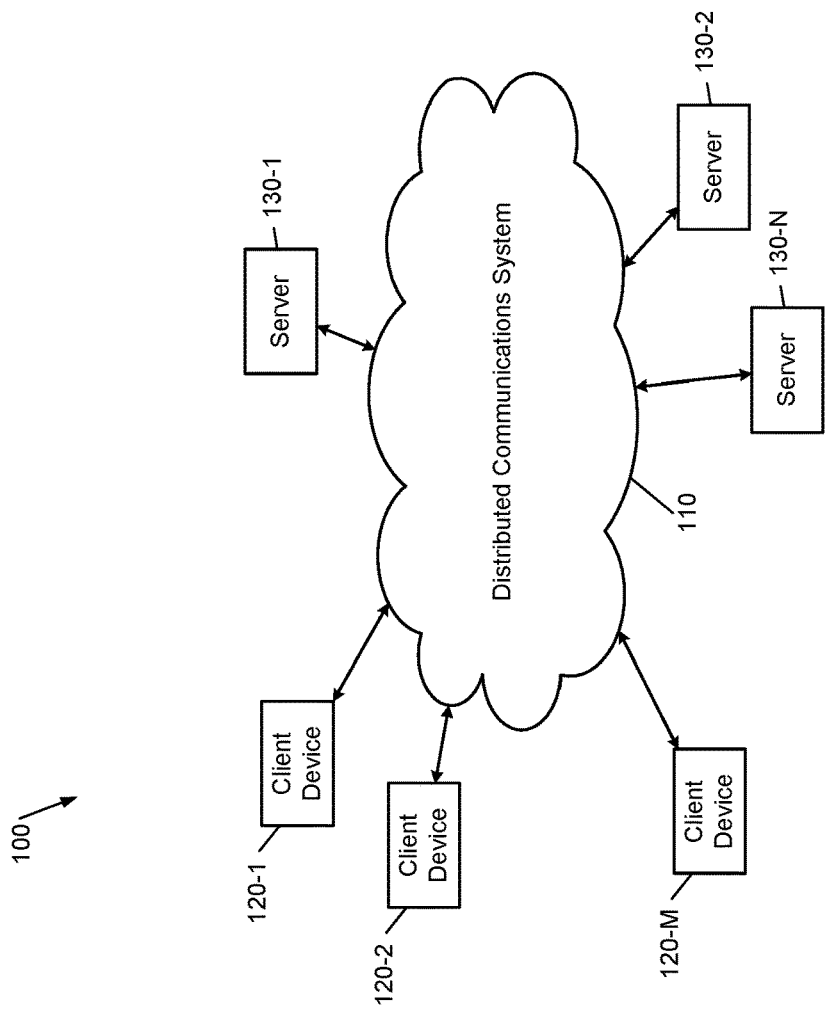
FIG. 3 is a functional block diagram of a distributed computing system that includes client devices and servers.

FIG. 3 shows a simplified example of a distributed computing system 100. The distributed computing system 100 includes a distributed communications system 110, one or more client devices 120-1, 120-2, . . . , and 120-M (collectively, client devices 120), and one or more servers 130-1, 130-2, . . . , and 130-M (collectively, servers 130). N and M are integers greater than or equal to one. The distributed communications system 110 may include a local area network (LAN), a wide area network (WAN) such as the Internet, or other type of network. For example, the servers 130 may be located at different geographical locations. The client devices 120 and the servers 130 communicate with each other via the distributed communications system 110. The client devices 120 and the servers 130 connect to the distributed communications system 110 using wireless and/or wired connections.

The client devices 120 may include smartphones, personal digital assistants (PDAs), laptop computers, personal computers (PCs), etc. The servers 130 may provide multiple services to the client devices 120. For example, the servers 130 may execute software applications developed by one or more vendors. The server 130 may host multiple databases that are relied on by the software applications in providing services to users of the client devices 120.

FIG. 4 shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110.

FIG. 5 shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized architecture. The bulk storage 182 may store one or more databases 188 that store data structures used by the server applications 186 to perform respective functions.

Block Diagrams

Figure 6:
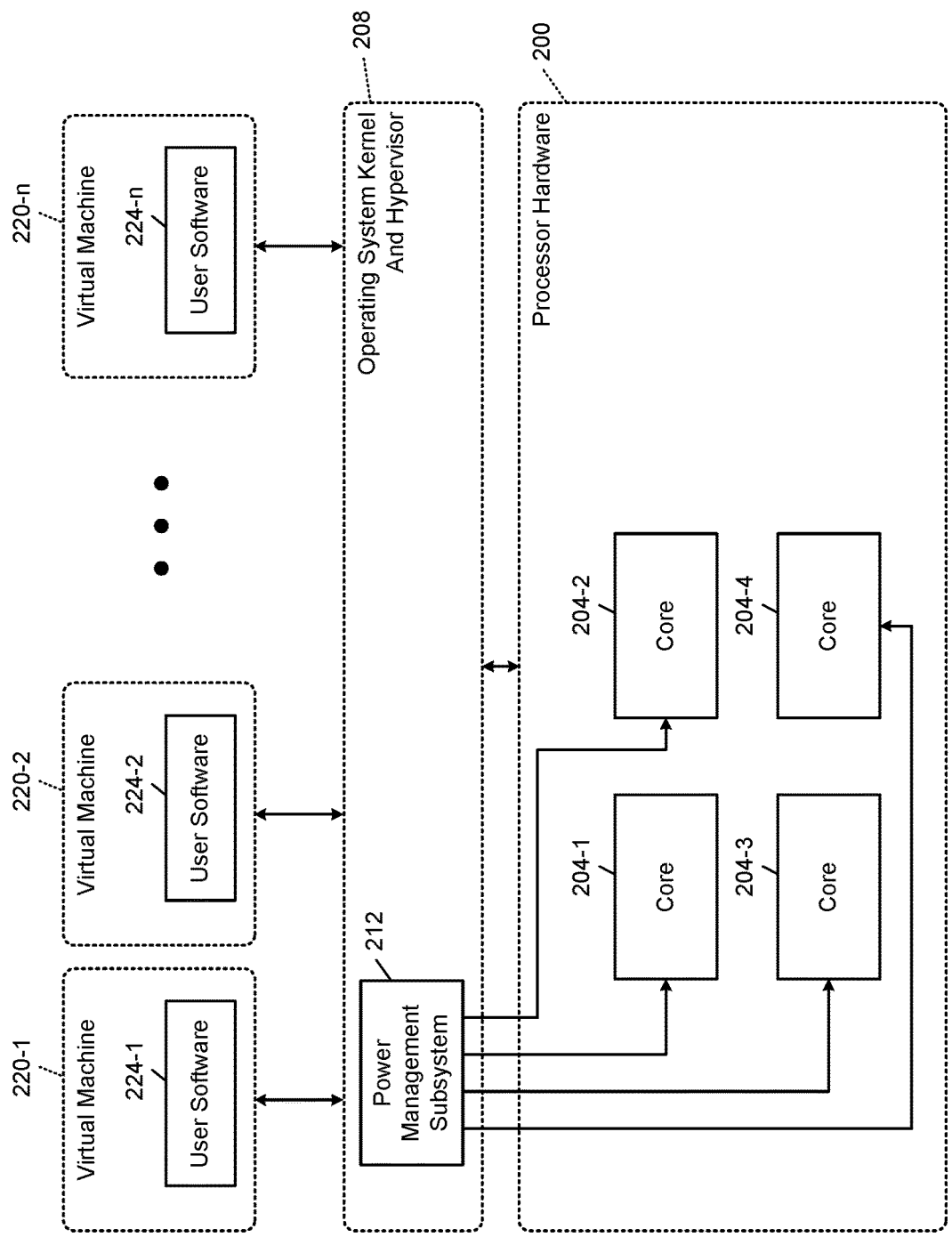
FIG. 6 is a high-level functional block diagram of a computing system in which the operating system controls multiple cores of processor hardware.

In FIG. 6, simplified processor hardware 200 includes four cores 204-1, 204-2, 204-3, and 204-4 (collectively, cores 204). A hypervisor layer 208 for an operating system kernel and hypervisor includes a power management subsystem 212 that manages the power states of the cores 204. For example, the power management subsystem 212 may control the operating frequencies of the cores 204.

Virtual machines 220-1, 220-2, . . . 220-n (virtual machines 220) execute on the operating system kernel and the hypervisor layer 208. User software 224-1, 224-2, . . . 224-n (user software 224) is shown schematically. The user software 224 may include end user software, such as office productivity applications and web browsers, and may include server applications, such as web servers and database servers. The operating system kernel and the hypervisor layer 208 may not have insight into the application level data within the virtual machines 220. As a result, the power management subsystem 212 may have to rely solely on the data provided by the cores 204 regarding their relative utilizations.

Figure 7:
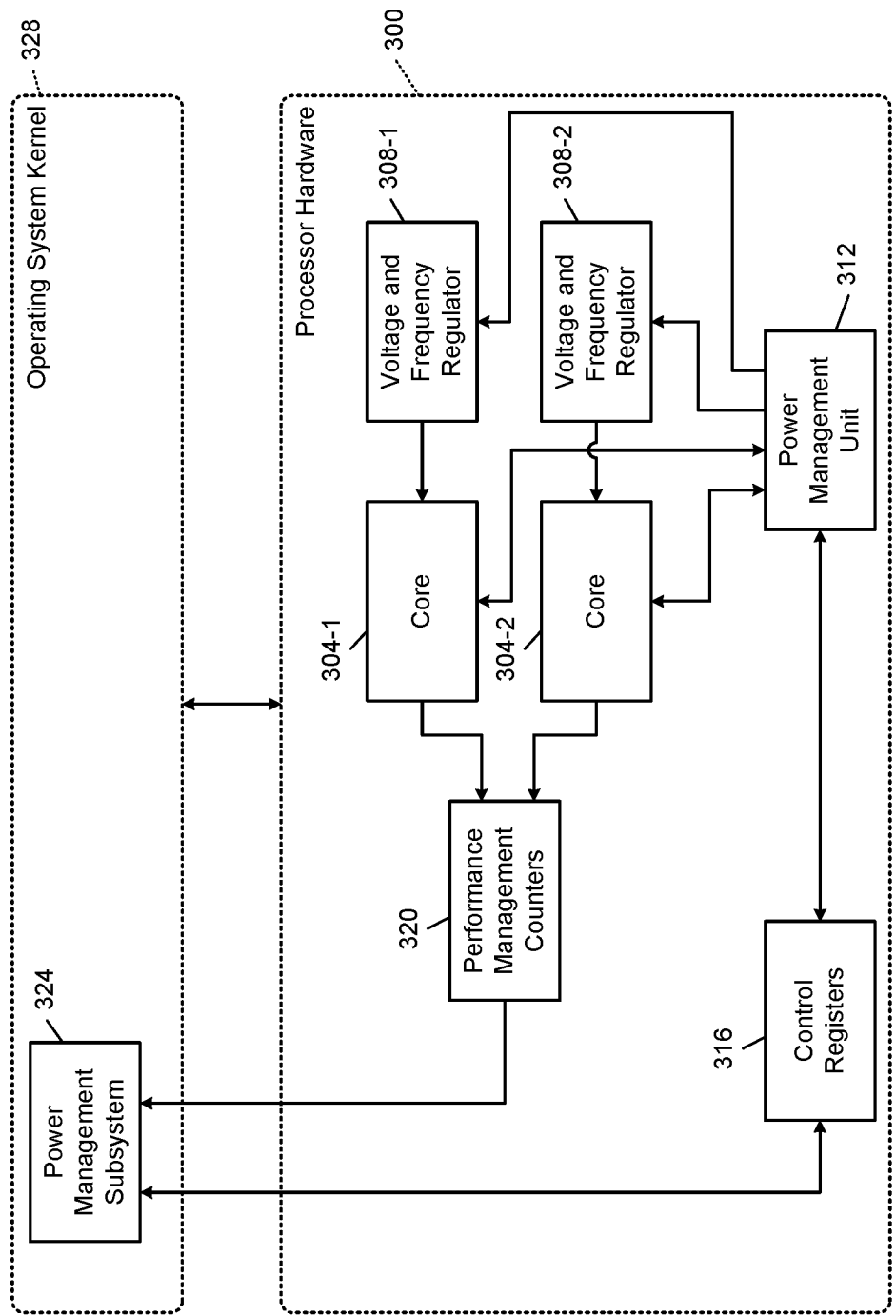
FIG. 7 is a functional block diagram of operating system control of an example implementation of processor hardware.

In FIG. 7, simplified processor hardware 300 includes cores 304-1 and 304-2. A voltage and frequency regulator 308-1 controls the operating voltage and frequency of the core 304-1 while a voltage and frequency regulator 308-2 controls the operating voltage and frequency of the core 304-2. For example, each of the voltage and frequency regulators 308 may include a voltage regulator as well as a frequency divider that vary in tandem according to instructions from a power management unit 312.

The power management unit 312 may communicate with the cores 304 to determine when the cores 304 should enter a power saving state and controls the frequency of the cores by sending appropriate commands to the voltage and frequency regulators 308. The power management unit 312 may operate according to settings made in control registers 316. In various implementations, the power management unit 312 may write certain data to the control registers 316, such as current operating frequencies of the cores 304.

Performance management counters 320 measure performance metrics of the cores 304. For example, the performance management counters 320 may measure the residency of each of the cores 304 within each of the power states. Based on data from the performance management counters, a power management subsystem 324 of an operating system kernel 328 may update values in the control registers 316 to instruct the power management unit 312 to adjust the frequency of the cores 304. As an example, the performance management counters 320 may measure the residency of the cores 304 in an active state (C0) as well as in a deep sleep (C6) state. The power management subsystem 324 periodically reads these values and adjusts the frequencies of the cores 304 to decrease the proportion of time spent in the deep sleep states.

In FIG. 8, an example of how user software may be used to manage processor frequencies is described. The processor hardware 300 of FIG. 7 is shown, while the voltage and frequency regulators 308 are omitted for clarity. An operating system kernel 350 includes a frequency governor system 354, which communicates with the performance management counters 320 and the control registers 316 through a processor hardware access layer 358. For example, the processor hardware access layer 358 may be a driver and may include the basic input/output system (BIOS).

User software 362 may include privileged user software 366. For example, the privileged user software 366 may operate with administrator (or, root) credentials. The privileged user software 366 may include a frequency governor system 370 according to the principles of the present disclosure. The frequency governor system 370 may access the control registers 316 and the performance management counters 320 by the processor hardware access layer 358. The frequency governor system 370 may need to disable the frequency governor system 354 and/or instruct the frequency governor system 354 that manual frequency control should be enabled.

For example, the Cpufreq Userspace frequency governor mentioned above may allow the privileged user software 366 to access the control registers 316 and the performance management counters 320. In some circumstances, the Cpufreq Userspace frequency governor imposes certain restrictions, such as larger granularity on values. As a result, the frequency governor system 370 may bypass the Userspace interface and instead directly write values to the control registers 316. This may allow for finer granularity of control of core frequencies. In the absence of the privileged user software 366, the frequency governor system 354 may control core frequencies, such as using one of the governors in the table above.

The frequency governor system 370 may be able to interact with the control registers 316 and the performance management counters 320 through the processor hardware access layer 358 even if the frequency governor system 354 were omitted. In other words, if the operating system kernel exposes hardware access to the privileged user software 366, the operating system kernel 350 may not need to include a frequency governor or understand the information exchanged between the frequency governor system 370 and the control registers 316 and the performance management counters 320.

In FIG. 9, an operating system kernel 400 may include a frequency governor system 404 according to the principles of the present disclosure, which directly accesses the control registers 316 and the performance management counters 320. The frequency governor system 404 may be implemented as part of the operating system kernel 400, as a user mode or protected mode driver, as part of the basic input/output system (BIOS) of a computer, or as a package of the operating system integrated with or executing on the operating system kernel 400.

In FIG. 10, processor hardware 420 may include cores 424-1 and 424-2 and voltage and frequency regulators 428-1 and 428-2, which are similar to those of FIG. 7. Further, a power management unit 432 may access performance management counters 436, which are similar to the performance management counters 320 of FIG. 7. In various implementations, the power management unit 432 may be activated or enabled by a power management subsystem 440 of an operating system kernel 444. For example, the power management subsystem 440 may handle power management including suspend, sleep and hibernate.

The power management subsystem 440 may write to control registers 448 which are used to control the power management unit 432. The power management unit 432 may include a power management coprocessor 452 and nonvolatile storage 456 that stores microcode. The microcode is executed by the power management coprocessor 452 to control the frequencies of the cores 424 according to the principles of the present disclosure. The microcode may also make decisions about when to enter each of the cores 424 into different power saving modes.

In various implementations, hardware implementations of the frequency governor of the present disclosure may be implemented in the processor hardware 420. However, for flexibility, the frequency governor may be represented as microcode.

Figure 11:
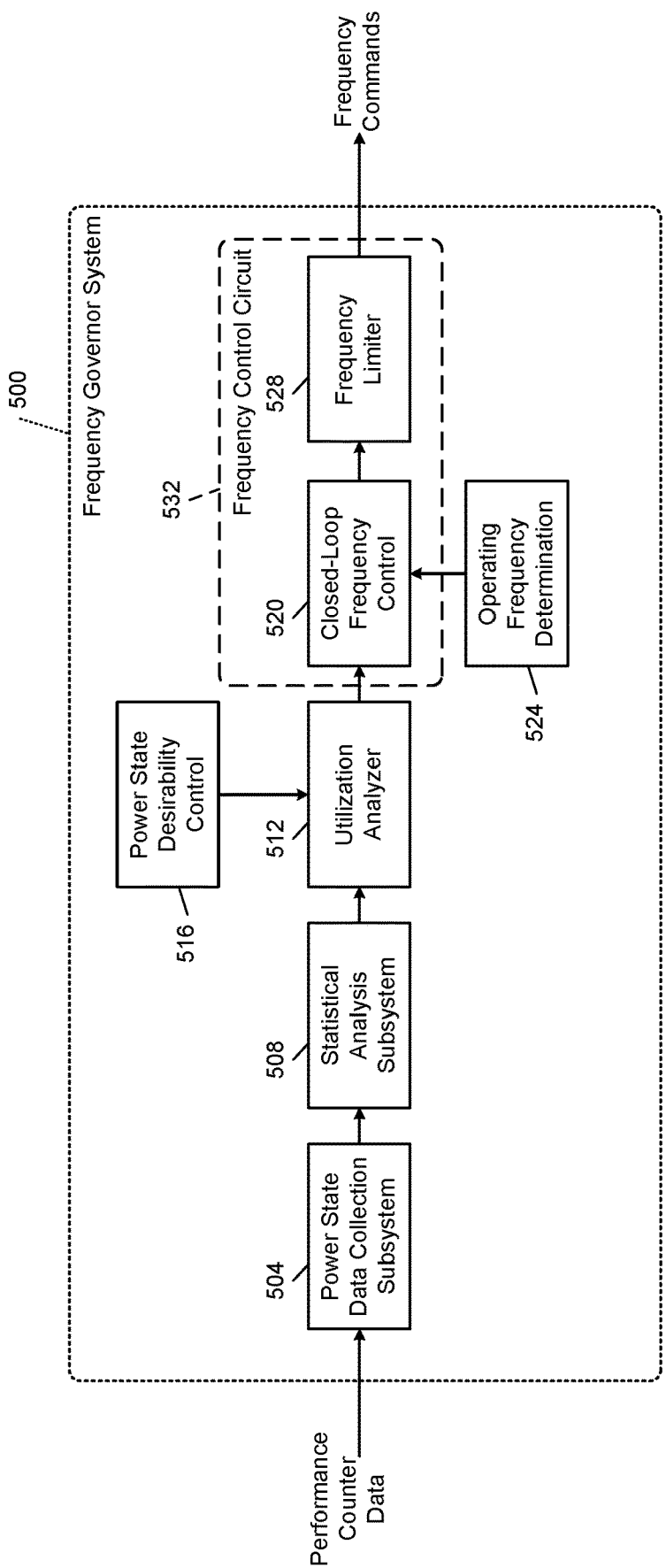
FIG. 11 is a functional block diagram of an example implementation of a frequency governor system according to the principles of the present disclosure.

In FIG. 11, a functional block diagram of an example frequency governor system 500 includes a power state data collection subsystem 504. For example, the power state data collection subsystem 504 may acquire power state residency information, such as from performance management counters described above. The power state data collection subsystem 504 may clear the relevant counters upon reading them so that each read is incremental to the last. In other implementations, the power state data collection subsystem 504 may subtract the current reading from the prior reading to determine the incremental change.

A statistical analysis subsystem 508 converts whatever form the power state data is collected in to a fractional representation, such as a real number between 0 and 1, for each power state for each core. Equivalently, the real number may be a percentage between 0 and 100.

A utilization analyzer 512 determines an effective utilization of each core. For example, this may be calculated as the ratio of fC0 to the sum of fC0 and fC6. In some implementations, the power states that indicate underutilization of the processor, such as C6, may be specified by power state desirability control 516. For example, for certain processors, a C5 state and/or a C7 state may also indicate underutilization of the processor. In the case where C5 and C7 also indicate underutilization, the power state desirability control 516 would indicate that the sum of fC5, fC6, and fC7 should be minimized. The utilization analyzer 512 may then include fC5 and fC7 in the sum of fC0 and fC6.

A closed-loop frequency control circuit 520 receives a current operating frequency for the cores from an operating frequency determination circuit 524. For example, the operating frequency determination circuit 524 may read the current operating frequencies of the cores from processor registers or performance counters. In other implementations, the operating frequency determination circuit 524 may store and recall the prior commanded target frequency with the assumption that the target frequency will now be the operating frequency.

The closed-loop frequency control circuit 520 attempts to maximize the effective utilization from the utilization analyzer 512. As described in more detail below, however, if the effective utilization becomes too high, overutilization may be occurring and therefore the frequency is increased to increase performance. A frequency limiter 528 may apply an upper limit to the commanded frequency from a closed-loop frequency control circuit 520. The frequency limiter 528 then sends frequency commands to the processor for each of the cores. Together, the closed-loop frequency control circuit 520 and the frequency limiter 528 may be referred to as a frequency control circuit 532.

Flowcharts

Figure 12:
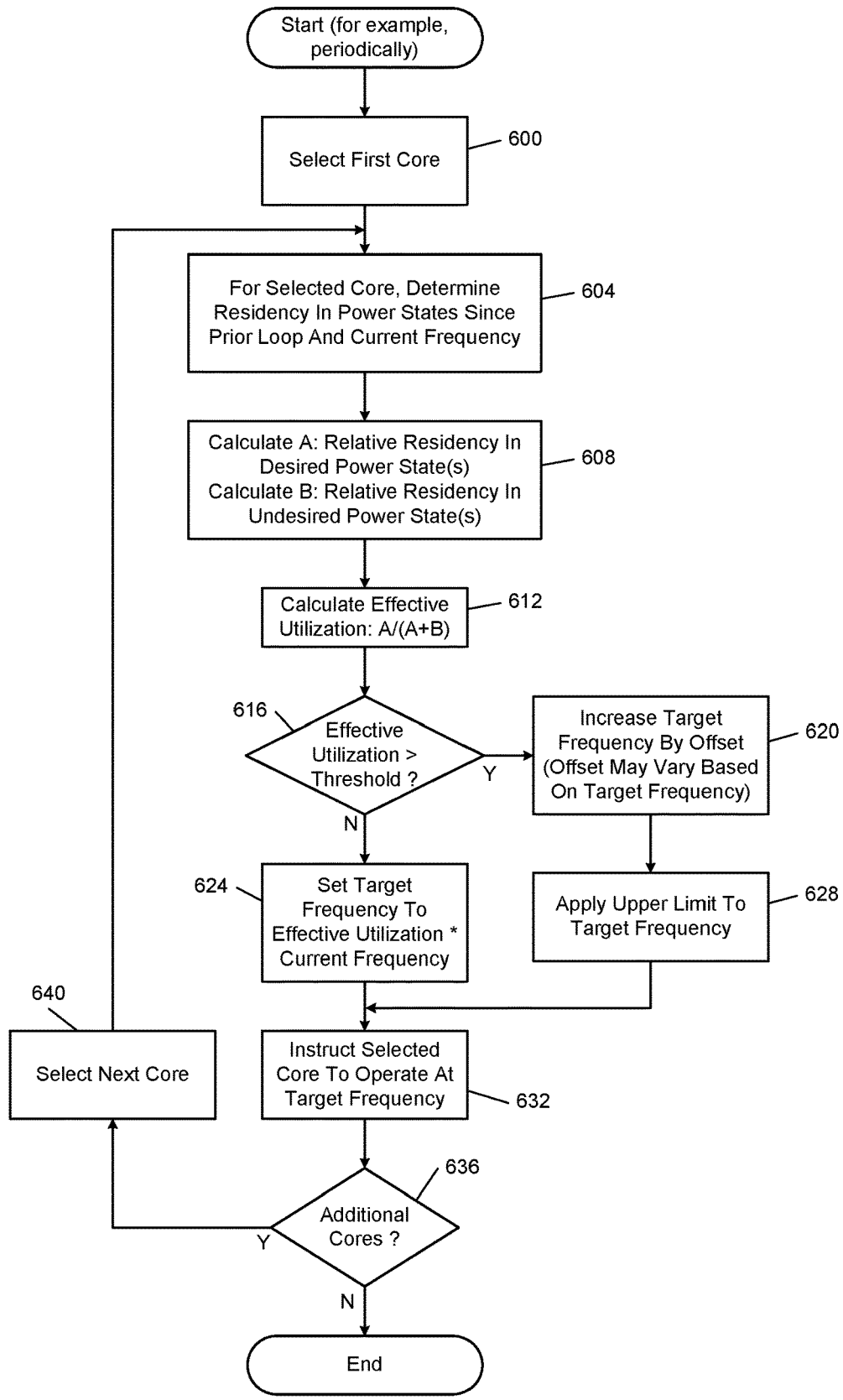
FIG. 12 is a flowchart of an example frequency control according to the principles of the present disclosure.

In FIG. 12, control begins at 600, where a first core of the processor is selected. Control may begin periodically, such as at a scheduled 10 millisecond interval. In 604, for the selected core, control determines residency of the core in the various power states since the prior execution of the control of FIG. 12. Control also determines the current frequency of the selected core.

At 608, control calculates a value labeled "A" indicating a relative residency of the core in desired power states—that is, power states that indicate utilization of the processor, such as C0. Control also calculates a value labeled "B" indicating the relative residency of the core in undesired power states that indicate underutilization of the core. For example, C6 may be an undesired power state.

As 612, control calculates an effective utilization based on the ratio of A to the sum of A and B. At 616, if the effective utilization exceeds the threshold, control transfers to 620; otherwise, control transfers to 624. If the effective utilization is above a threshold, that may indicate overutilization of the core—in other words, that the frequency of the core should be increased to accommodate the load. As 620, control increases the target frequency by a specified offset. The offset may vary based on the target frequency.

Control continues at 628, where an upper limit is applied to the target frequency. Control then continues at 632. At 624, control sets the target frequency to the product of the effective utilization and the current frequency of the core. Control then continues at 632. At 632, control instructs the selected core to operate at the target frequency. Control continues at 636 where, if there are additional cores remaining to evaluate, control transfers to 640; otherwise, control ends. At 640, control selects the next core and returns to 604.

Figure 13A:
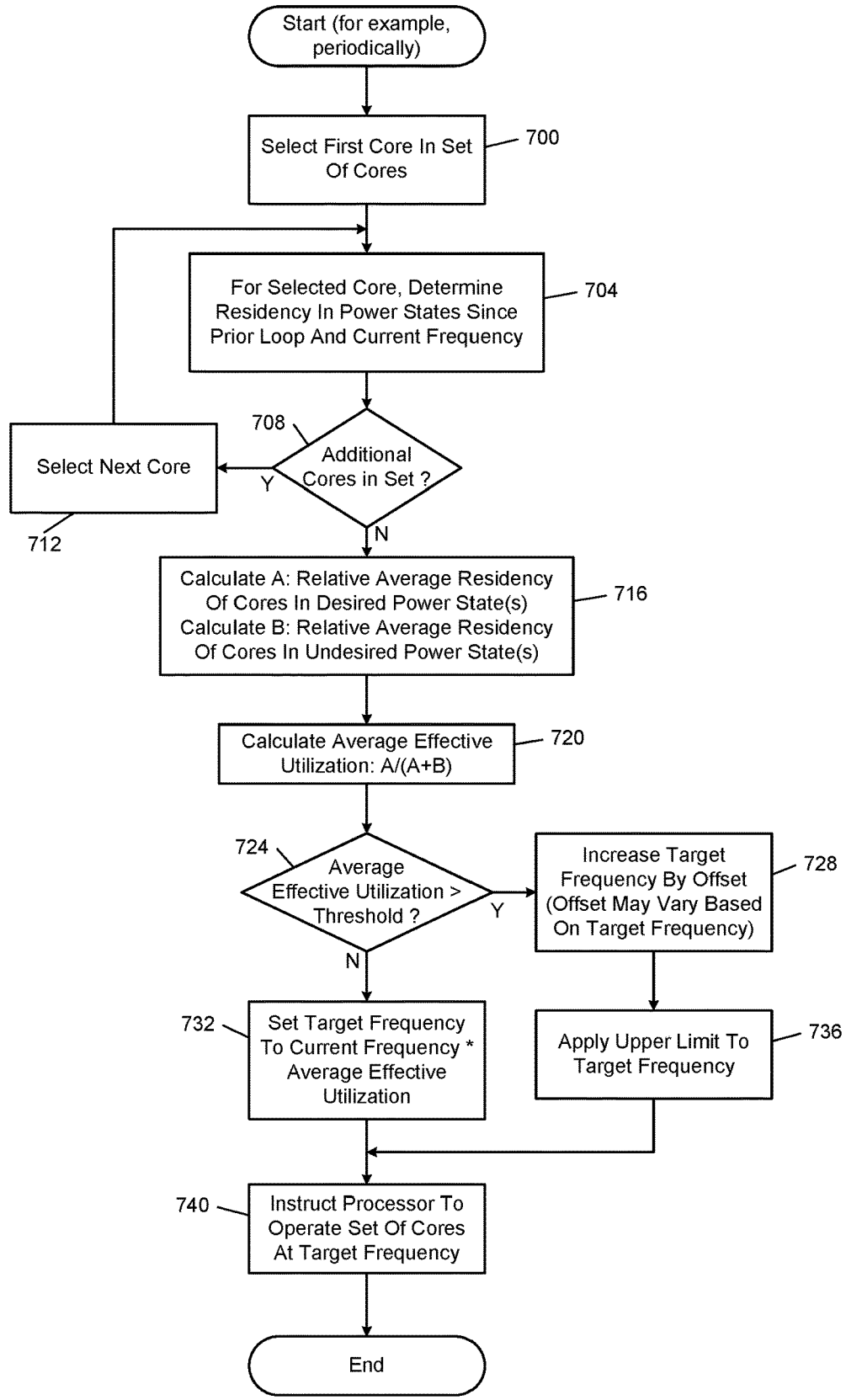
FIG. 13A and FIG. 13B are flowcharts of frequency control according to the principles of the present disclosure in which all processor cores in a set are operated at the same frequency.
Figure 13B:
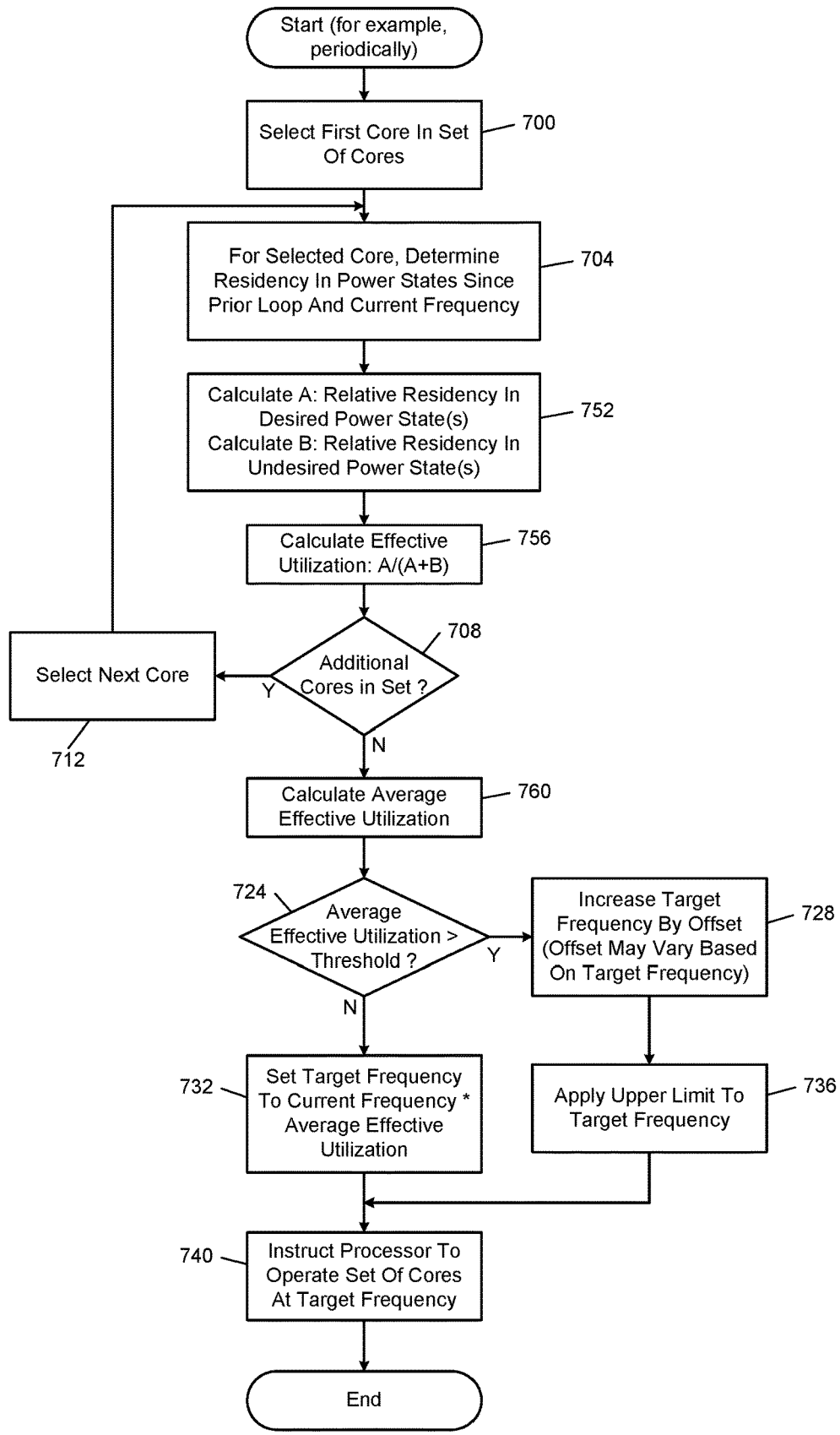

In FIG. 13A and FIG. 13B, the frequencies of a set of cores are controlled together and therefore are evaluated together in each control iteration. For example, a processor may not have individualized frequency control of cores and therefore all the cores of the processor are part of a single set. In another example, each pair of cores of the processor may form a set. When there are multiple sets, the control of FIG. 13A or FIG. 13B is performed for each set.

In various implementations, multiple cores of a processor may be assigned to a certain virtual machine or container. These multiple cores may form a set. Then, different parameters may be used for the frequency governor based on different requirements for different virtual machines. For example, the cores dedicated to a virtual machine with more demanding service level objectives may be controlled by the new frequency governor with parameters favoring performance over power savings.

Control begins at 700 and selects the first core of the set of cores. At 704, control determines the current frequency for the selected core, as well as determining residency in the available power states since the prior execution of this control. At 708, if there are additional cores in the set to evaluate, control transfers to 712; otherwise, control transfers to 716. At 712, control selects the next core in the set and returns to 704.

At 716, control calculates (A) the relative residency of the cores in the desired power states as well as (B) the relative residency of the cores in undesired power states. Specifically, the relative residencies in 716 are averaged across all of the cores in the set. At 720, control calculates an average effective utilization of the cores based on the ratio of A to the sum of A and B.

At 724, if the average effective utilization is greater than the threshold, control transfers to 728; otherwise, control transfers to 732. At 728, control increases the target frequency by an offset and continues at 736. At 736, control applies an upper limit to the target frequency and continues at 740. At 732, control sets the target frequency of the set of cores to the product of the average effective utilization and the current frequency. Control continues at 740 and instructs the processor to operate the set of cores at the target frequency. Control then ends.

FIG. 13B is similar to FIG. 13A, with the exception being that the effective utilization of each core is determined separately and the individual effective utilizations are averaged to determine average effective utilization. Elements of FIG. 13B that are similar to those of FIG. 13A are labeled with the same reference numerals as FIG. 13A.

After 704, control continues at 752, where control calculates the relative residency of the core in the desired power states as well as the relative residency of the core in undesired power states. At 756, control calculates the effective utilization for the selected core. Control then continues at 708, where if there are additional cores in the set, control transfers to 712; otherwise, control transfers to 760. At 760, control averages the effective utilizations of the cores to create an average effective utilization. Control then continues at 724.

Figure 14:
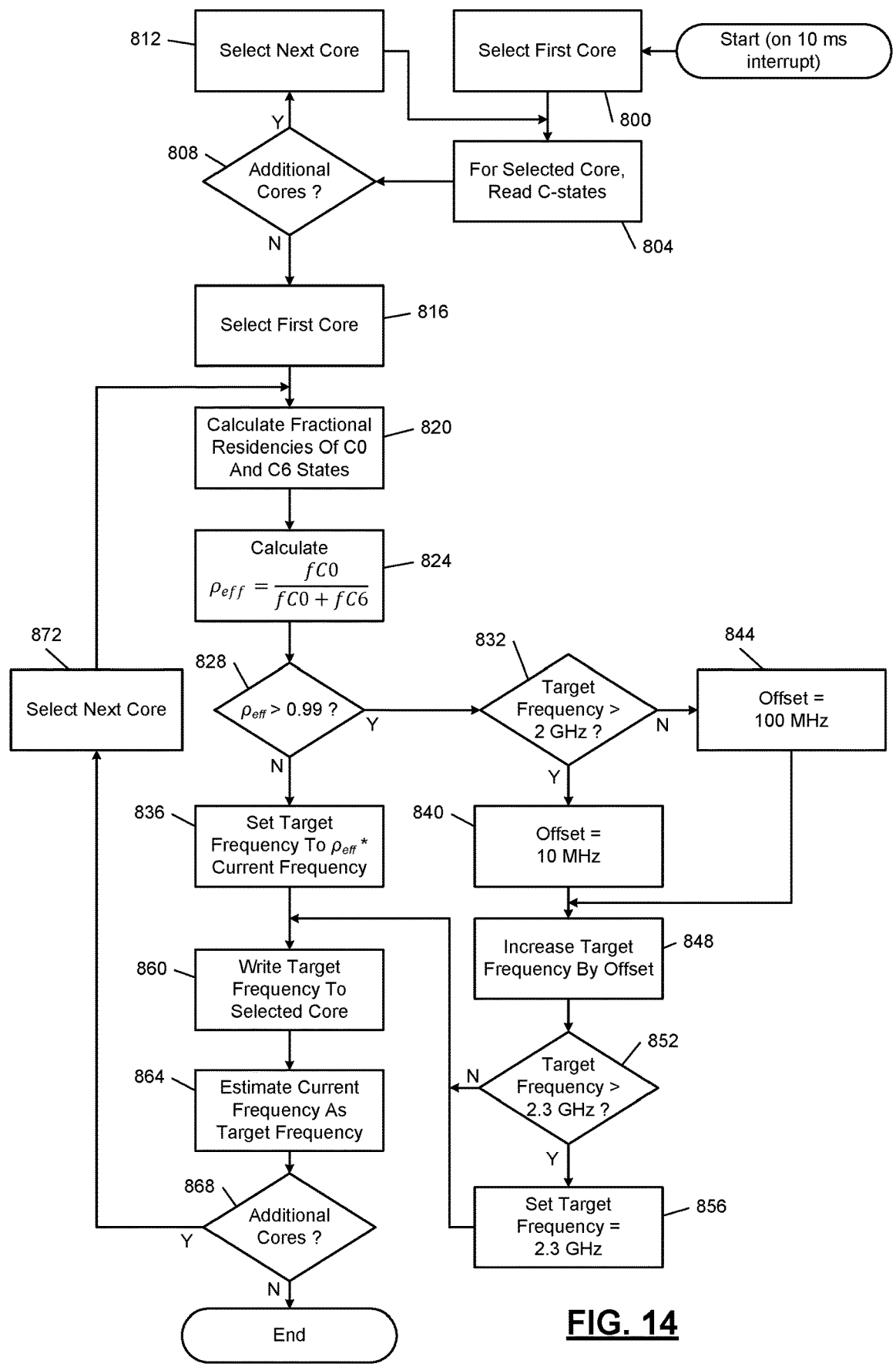
FIG. 14 is a flowchart of a more specific example of the operation of FIG. 12 in which specific values for certain variables are presented as examples.

In FIG. 14, control begins on a 10-millisecond schedule at 800. Control selects the first core and continues at 804. For the selected core, control reads the C-states in which the selected core resided since the last execution of the FIG. 14 control. At 808, if there are additional cores, control transfers to 812; otherwise, control transfers to 816. At 812, control selects the next core and returns to 804.

At 816, control selects the first core. At 820, control calculates the fractional residencies of the selected core in the C0 and C6 power states. At 824, control calculates an effective utilization based on the ratio of fC0 to the sum of fC0 and fC6. At 828, if the effective utilization is greater than a threshold, such as 0.99, control transfers to 832. Otherwise, control transfers to 836.

At 832, if the target frequency is over a threshold indicating turbo (high power) operation, control transfers to 840; otherwise, control transfers to 844. At 840, control sets the offset to 10 MHz and continues at 848. At 844, control sets the offset to 100 MHz and continues at 848. At 848, control increases the target frequency by the offset and continues at

852. If the target frequency is greater than a maximum upper limit, control transfers to 856; otherwise, control transfer to 860.

At 856, control sets the target frequency to the upper limit and continues at 860. At 860, control writes the target frequency to the model specific register of the selected core. At 864, control estimates the current frequency of the selected core as the target frequency. This current frequency is then used in the next iteration of the loop in 836. Control continues at 868 where, if there are additional cores, control transfers to 872; otherwise, control ends. At 872, control selects the next core and returns to 820.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A frequency governing method for a processor, the method comprising:
    reading power management information from the processor, wherein the processor is configured to selectively operate in a plurality of power saving states, and wherein the power management information includes (i) a first occupancy metric indicating occupancy of a first core of the processor in an active state and (ii) a second occupancy metric indicating occupancy of the first core of the processor in a first power saving state of the plurality of power saving states, wherein a latency of the first core to return to the active state is greatest for the first power saving state from among the plurality of power saving states;
    generating an effective utilization based on the first occupancy metric and the second occupancy metric;
    setting a target frequency by performing a selected action of:
        a first action including increasing the target frequency; and
        a second action including decreasing the target frequency with respect to a current frequency of the processor based on the effective utilization,
        wherein the selected action is selected according to the effective utilization; and
    instructing the processor to operate the first core at the target frequency.

2. The method of claim 1, wherein:
    the first action is selected if the effective utilization is greater than a threshold; and
    the second action is selected if the effective utilization is less than the threshold.

3. The method of claim 1, wherein decreasing the target frequency includes setting the target frequency to a product of the effective utilization and the current frequency of the processor.

4. The method of claim 1, wherein:
    the first occupancy metric indicates a fraction of time the first core occupied the active state since a prior analysis; and
    the second occupancy metric indicates a fraction of time the first core occupied the first power saving state since the prior analysis.

5. The method of claim 4, wherein the effective utilization is generated based on a division of the first occupancy metric by a sum of the first occupancy metric and the second occupancy metric.

6. The method of claim 1, wherein:
    the processor includes multiple cores including the first core;
    the method includes instructing the processor to operate all of the multiple cores at the target frequency; and
    the method includes one of:
        determining an individual effective utilization for each core of the multiple cores and averaging the individual effective utilizations to generate the effective utilization; and
        averaging the first occupancy metric across the multiple cores, averaging the second occupancy metric across the multiple cores, and generating the effective utilization based on the averaged first occupancy metric and the averaged second occupancy metric.

7. The method of claim 1, wherein:
    the processor includes multiple cores including the first core; and
    the method includes performing the reading, the generating, the setting, and the instructing separately for each core of the multiple cores.

8. A frequency governor system for a processor having a first core, the system comprising:
    a power state data collection subsystem configured to read power management information from the processor, wherein the processor is configured to selectively operate in a plurality of power saving states, and wherein the power management information includes (i) a first occupancy metric indicating occupancy of the first core of the processor in an active state and (ii) a second occupancy metric indicating occupancy of the first core of the processor in a first power saving state of the plurality of power saving states, wherein a latency of the first core to return to the active state is greatest for the first power saving state from among the plurality of power saving states;
    a utilization analyzer configured to generate an effective utilization based on the first occupancy metric and the second occupancy metric; and
    a frequency control circuit configured to:
        set a target frequency by performing a selected action of:
            a first action including increasing the target frequency; and
            a second action including decreasing the target frequency with respect to a current frequency of the processor based on the effective utilization,
            wherein the selected action is selected according to the effective utilization; and
        instruct the processor to operate the first core at the target frequency.

9. The system of claim 8, wherein the frequency control circuit is configured to:
    select the first action if the effective utilization is greater than a threshold; and
    select the second action if the effective utilization is less than the threshold.

10. The system of claim 8, wherein the frequency control circuit is configured to decrease the target frequency by setting the target frequency to a product of the effective utilization and the current frequency of the processor.

11. The system of claim 8, wherein:
    the first occupancy metric indicates a fraction of time the first core occupied the active state since a prior analysis by the utilization analyzer; and
    the second occupancy metric indicates a fraction of time the first core occupied the first power saving state since the prior analysis.

12. The system of claim 11, wherein the utilization analyzer is configured to generate the effective utilization based on a division of the first occupancy metric by a sum of the first occupancy metric and the second occupancy metric.

13. The system of claim 8, wherein:
the processor includes multiple cores including the first core;
the frequency control circuit is configured to instruct the processor to operate all of the multiple cores at the target frequency; and
the utilization analyzer is configured to generate the effective utilization by one of:
  determining an individual effective utilization for each core of the multiple cores and averaging the individual effective utilizations to generate the effective utilization; and
  averaging the first occupancy metric across the multiple cores, averaging the second occupancy metric across the multiple cores, and generating the effective utilization based on the averaged first occupancy metric and the averaged second occupancy metric.

14. A frequency governor system for a processor having a first core, the system comprising:
power state data collection means for reading power management information from the processor, wherein the processor is configured to selectively operate in a plurality of power saving states, and wherein the power management information includes (i) a first occupancy metric indicating occupancy of the first core of the processor in an active state and (ii) a second occupancy metric indicating occupancy of the first core of the processor in a first power saving state of the plurality of power saving states wherein a latency of the first core to return to the active state is greatest for the first power saving state from among the plurality of power saving states;
utilization analysis means for generating an effective utilization based on the first occupancy metric and the second occupancy metric; and
frequency control means for:
  setting a target frequency by performing a selected action of:
    a first action including increasing the target frequency; and
    a second action including decreasing the target frequency with respect to a current frequency of the processor based on the effective utilization,
  wherein the selected action is selected according to the effective utilization; and
  instructing the processor to operate the first core at the target frequency.

15. The system of claim 14, wherein the frequency control means:
selects the first action if the effective utilization is greater than a threshold; and
selects the second action if the effective utilization is less than the threshold.

16. The system of claim 14, wherein the frequency control means decreases the target frequency by setting the target frequency to a product of the effective utilization and the current frequency of the processor.

17. The system of claim 14, wherein:
the first occupancy metric indicates a fraction of time the first core occupied the active state since a prior analysis by the utilization analysis means; and
the second occupancy metric indicates a fraction of time the first core occupied the first power saving state since the prior analysis.

18. The system of claim 17, wherein the utilization analysis means generates the effective utilization based on a division of the first occupancy metric by a sum of the first occupancy metric and the second occupancy metric.

19. The system of claim 14, wherein:
the processor includes multiple cores including the first core;
the frequency control means instructs the processor to operate all of the multiple cores at the target frequency; and
the utilization analysis means generates the effective utilization by one of:
  determining an individual effective utilization for each core of the multiple cores and averaging the individual effective utilizations to generate the effective utilization; and
  averaging the first occupancy metric across the multiple cores, averaging the second occupancy metric across the multiple cores, and generating the effective utilization based on the averaged first occupancy metric and the averaged second occupancy metric.

* * * * *